United States Patent
Powell et al.

(10) Patent No.: US 8,921,629 B2
(45) Date of Patent: Dec. 30, 2014

(54) PROCESS TO PRODUCE BIOFUELS VIA ORGANIC PHASE THERMAL HYDROCATALYTIC TREATMENT OF BIOMASS

(71) Applicant: Shell Oil Company, Houston, TX (US)

(72) Inventors: Joseph Broun Powell, Houston, TX (US); Kimberly Ann Johnson, Richmond, TX (US)

(73) Assignee: Shell Oil Company, Houston, TX (US)

( * ) Notice: Subject to any disclaimer, the term of this patent is extended or adjusted under 35 U.S.C. 154(b) by 159 days.

(21) Appl. No.: 13/663,163

(22) Filed: Oct. 29, 2012

(65) Prior Publication Data
US 2013/0109896 A1 May 2, 2013

Related U.S. Application Data

(60) Provisional application No. 61/553,582, filed on Oct. 31, 2011.

(51) Int. Cl.
| | |
|---|---|
| *C10G 1/06* | (2006.01) |
| *C10L 1/02* | (2006.01) |
| *C10L 10/08* | (2006.01) |
| *C10L 1/198* | (2006.01) |
| *C10L 1/14* | (2006.01) |
| *C10M 145/40* | (2006.01) |
| *C10M 169/04* | (2006.01) |
| *C10N 30/06* | (2006.01) |
| *C10N 40/25* | (2006.01) |

(52) U.S. Cl.
CPC ............ *C10G 1/065* (2013.01); *C10N 2240/10* (2013.01); *C10M 2209/12* (2013.01); *C10L 1/02* (2013.01); *C10N 2230/06* (2013.01); *C10L 2270/023* (2013.01); *C10L 2270/026* (2013.01); *C10N 2230/56* (2013.01); *Y02T 50/678* (2013.01); *C10N 2220/022* (2013.01); *Y02E 50/13* (2013.01); *C10L 10/08* (2013.01); *C10L 1/1988* (2013.01); *C10N 2230/54* (2013.01); *C10N 2030/06* (2013.01); *C10L 1/026* (2013.01); *C10N 2230/02* (2013.01); *C10L 1/143* (2013.01); *C10L 1/1985* (2013.01); *C10L 1/023* (2013.01); *C10M 145/40* (2013.01); *C10M 169/041* (2013.01); *C10N 2220/082* (2013.01); *C10N 2040/25* (2013.01); *C10M 169/04* (2013.01)
USPC ........... 585/240; 585/242; 585/315; 585/469; 585/638; 585/639; 585/733; 44/605; 44/606

(58) Field of Classification Search
USPC .......................................... 422/620; 585/315
See application file for complete search history.

(56) References Cited

U.S. PATENT DOCUMENTS

| 4,935,567 A | 6/1990 | Yokoyama et al. |
|---|---|---|
| 7,285,179 B2 | 10/2007 | Snekkenes et al. |

(Continued)

FOREIGN PATENT DOCUMENTS

| EP | 2182047 | 1/2009 |
|---|---|---|
| WO | 2009083985 | 7/2009 |

(Continued)

OTHER PUBLICATIONS

Renon, H., et al; "Local Compositions in Thermodynamic Excess Functions for Liquid Mixtures", AIChE Journal, vol. 14, No. 1, pp. 135-144, Jan. 1968.
Gupta, R., et al., "Liquid-Liquid Extraction Using the Composition-Induced Phase Separation Process," Ind. Eng. Chem. Res., 1996, vol. 35, No. 7, pp. 2360-2368.
Yaws, C. L.,Table 15-1, "Solubility in Water and Octanol-Water Partition Coefficient-Organic Compounds", Chemical Properties Handbook, 1999, pp. 371-388.

(Continued)

Primary Examiner — Brian McCaig

(57) ABSTRACT

Biofuels can be produced via an organic phase hydrocatalytic treatment of biomass using an organic solvent that is partially miscible with water. An organic hydrocarbon-rich phase from the hydrocatalytically treated products can be recycled to form at least a portion of the organic phase.

14 Claims, 1 Drawing Sheet

(56) References Cited

U.S. PATENT DOCUMENTS

| | | | |
|---|---|---|---|
| 2010/0192457 A1* | 8/2010 | Tsurutani et al. | 44/605 |
| 2010/0236988 A1 | 9/2010 | Gabrielov et al. | |
| 2011/0154721 A1 | 6/2011 | Chheda et al. | |
| 2011/0154722 A1* | 6/2011 | Chheda et al. | 44/307 |
| 2011/0167713 A1 | 7/2011 | Quignard et al. | |
| 2011/0282115 A1 | 11/2011 | Chheda et al. | |

FOREIGN PATENT DOCUMENTS

| | | |
|---|---|---|
| WO | 2011082000 | 7/2011 |
| WO | 2012088073 | 6/2012 |

OTHER PUBLICATIONS

Stephenson, R. et al., "Mutual Solubility of Water and Aliphatic Alcohols", J. Chem. Eng. Data, 1984, pp. 287-290.

Neely, B. J. et al., "Mutual Solubility Measurements of Hydrocarbon-Water Systems Containing Benzene, Toluene, and 3-Methylpentane"; J. Chem. Eng. Data, 2008, vol. 53, pp. 165-174.

PCT International Search Report dated Jan. 31, 2013, Ref. No. TH4182-PCT, Application No. PCT/US2012/062400 filed Oct. 29, 2012.

* cited by examiner

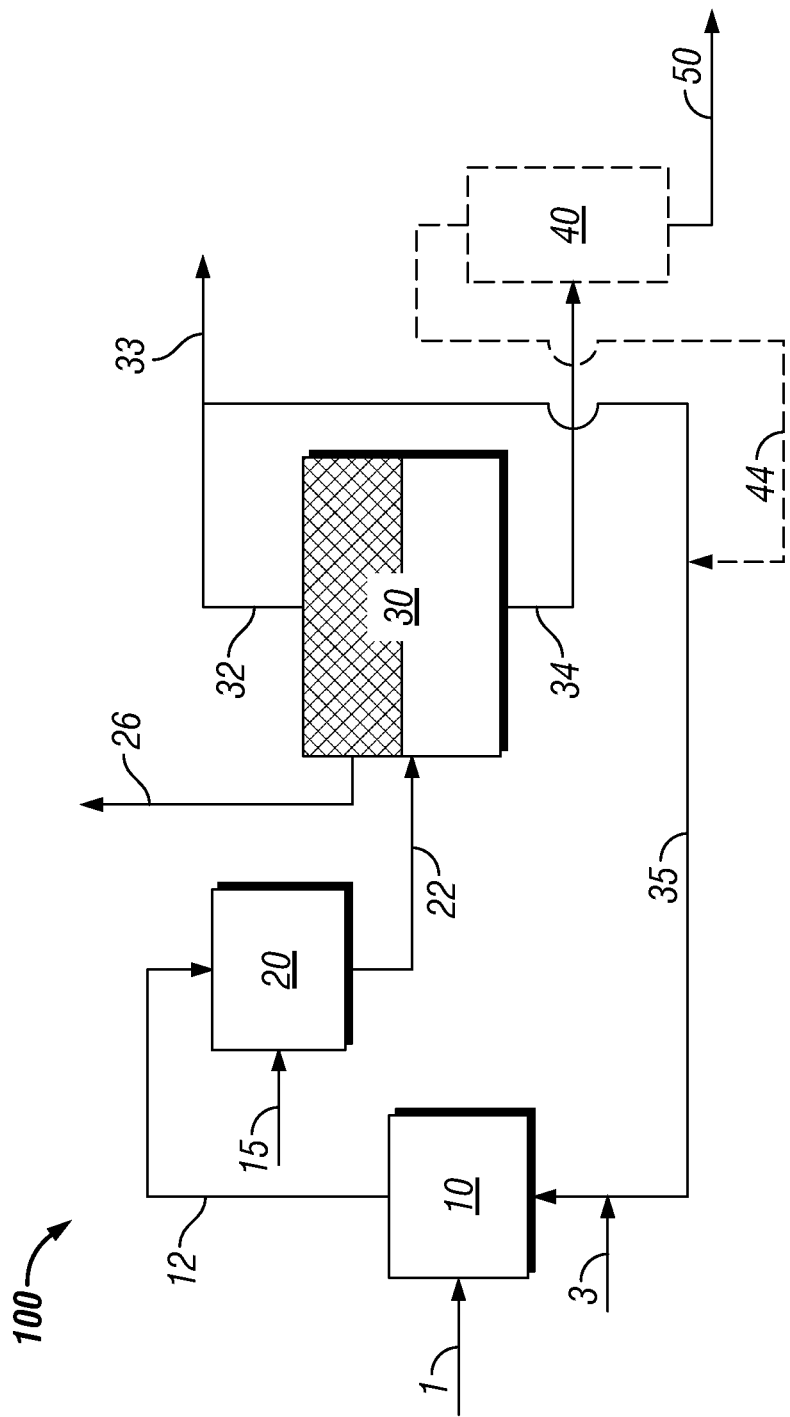

PROCESS TO PRODUCE BIOFUELS VIA ORGANIC PHASE THERMAL HYDROCATALYTIC TREATMENT OF BIOMASS

The present application claims the benefit of U.S. Patent Application No. 61/553,582, filed Oct. 31, 2011, the entire disclosure of which is hereby incorporated by reference.

FIELD OF THE INVENTION

The invention relates to the production of higher hydrocarbons suitable for use in transportation fuels and industrial chemicals from biomass.

BACKGROUND OF THE INVENTION

A significant amount of attention has been placed on developing new technologies for providing energy from resources other than fossil fuels. Biomass is a resource that shows promise as a fossil fuel alternative. As opposed to fossil fuel, biomass is also renewable.

Biomass may be useful as a source of renewable fuels. One type of biomass is plant biomass. Plant biomass is the most abundant source of carbohydrate in the world due to the lignocellulosic materials composing the cell walls in higher plants. Plant cell walls are divided into two sections, primary cell walls and secondary cell walls. The primary cell wall provides structure for expanding cells and is composed of three major polysaccharides (cellulose, pectin, and hemicellulose) and one group of glycoproteins. The secondary cell wall, which is produced after the cell has finished growing, also contains polysaccharides and is strengthened through polymeric lignin covalently cross-linked to hemicellulose. Hemicellulose and pectin are typically found in abundance, but cellulose is the predominant polysaccharide and the most abundant source of carbohydrates. However, production of fuel from cellulose poses a difficult technical problem. Some of the factors for this difficulty are the physical density of lignocelluloses (like wood) that can make penetration of the biomass structure of lignocelluloses with chemicals difficult and the chemical complexity of lignocelluloses that lead to difficulty in breaking down the long chain polymeric structure of cellulose into carbohydrates that can be used to produce fuel.

Most transportation vehicles require high power density provided by internal combustion and/or propulsion engines. These engines require clean burning fuels which are generally in liquid form or, to a lesser extent, compressed gases. Liquid fuels are more portable due to their high energy density and their ability to be pumped, which makes handling easier.

Currently, bio-based feedstocks such as biomass provide the only renewable alternative for liquid transportation fuel. Unfortunately, the progress in developing new technologies for producing liquid biofuels has been slow in developing, especially for liquid fuel products that fit within the current infrastructure. Although a variety of fuels can be produced from biomass resources, such as ethanol, methanol, and vegetable oil, and gaseous fuels, such as hydrogen and methane, these fuels require either new distribution technologies and/or combustion technologies appropriate for their characteristics. The production of some of these fuels also tends to be expensive and raise questions with respect to their net carbon savings. There is a need to directly process biomass into liquid fuels.

SUMMARY OF THE INVENTION

In an embodiment, a method comprises:
(a) providing a biomass feedstock containing cellulose and water;
(b) contacting the biomass feedstock with an organic solvent having partial miscibility with water at 25° C. to form a digested biomass stream containing the organic solvent and water, at an organic solvent to water mass ratio of greater than 1:1;
(c) contacting the digested biomass stream with molecular hydrogen in the presence of a metal catalyst capable of activating molecular hydrogen, under organic phase hydrothermal conditions to form a hydrocatalytically treated mixture that contains a plurality of hydrocarbon molecules and oxygenated hydrocarbon molecules,
(d) phase separating the hydrocatalytically treated mixture, by liquid-liquid separation, into an organic hydrocarbon-rich phase and a water phase comprising water soluble oxygenated hydrocarbons;
(e) providing at least a portion of the organic hydrocarbon-rich phase to step (b) to form at least a portion of the organic solvent; and
(f) processing at least a portion of the water phase, at least a portion of the organic hydrocarbon-rich phase, or at least a portion of both water phase and organic hydrocarbon-rich phase, to form a fuel blend comprising higher hydrocarbons.

The features and advantages of the invention will be apparent to those skilled in the art. While numerous changes may be made by those skilled in the art, such changes are within the spirit of the invention.

BRIEF DESCRIPTION OF THE DRAWING

This drawing illustrates certain aspects of some of the embodiments of the invention, and should not be used to limit or define the invention.

The FIGURE schematically illustrates a block flow diagram of an embodiment of a higher hydrocarbon production process 100 of this invention.

DETAILED DESCRIPTION OF THE INVENTION

The invention relates to the production of higher hydrocarbons suitable for use in transportation fuels and industrial chemicals from biomass. The higher hydrocarbons produced are useful in forming transportation fuels, such as synthetic gasoline, diesel fuel, and jet fuel, as well as industrial chemicals. As used herein, the term "higher hydrocarbons" refers to hydrocarbons having an oxygen to carbon ratio less than the oxygen to carbon ratio of at least one component of the biomass feedstock. As used herein the term "hydrocarbon" refers to an organic compound comprising primarily hydrogen and carbon atoms, which is also an unsubstituted hydrocarbon. In certain embodiments, the hydrocarbons of the invention also comprise heteroatoms (i.e., oxygen sulfur, phosphorus, or nitrogen) and thus the term "hydrocarbon" may also include substituted hydrocarbons. The term "soluble carbohydrates" refers to oligosaccharides and monosaccharides that are soluble in the digestive solvent and that can be used as feedstock to the hydrogenolysis reaction (e.g., pentoses and hexoses). "

Aqueous phase" refers to a liquid phase that can be diluted by water at 1:1 or greater water/liquid-phase ratio, without separating into a second liquid phase. The second liquid phase is defined as a phase having an interfacial tension greater than zero relative to the first phase. Second phase formation can be identified via formation of a liquid-liquid interface which reflects and refracts light, sound, or other waves, for two phases which may separate via density difference, or remain mixed as an emulsion. If a second liquid phase forms upon addition of water at greater than about 5 weight percent relative to the total mixture, the phase having the highest water concentration is designated as the "aqueous phase", with the other phase called the "organic phase". For "hydrocatalytic treatment" or "organic phase hydrocatalytic" processing, the reaction is conducted with an organic solvent which if mixed with water at greater than 1:1 mass ratio, would separate into an organic hydrocarbon-rich phase and an aqueous phase. The organic phase must solubilize some water to effect hydrolysis and "reforming" reactions. A lower limit of about 1 wt % solubility of water in the organic solvent phase at reaction temperatures defines a solvent phase suitable for "hydrocatalytic treatment."

The methods of the invention have an advantage using the organic-rich layer from thermocatalytic processing of biomass feedstocks recycled as solvent to digest biomass. The solvent is effective in preventing tar or heavy ends deposition during biomass digestion, and in assisting with the digestion via solvation, and recycle of carboxylic acid components. It can be used for thermocatalytic biofuels processes where the composition of intermediate products formed via reforming, hydrogenolysis, or hydrodeoxygenation reaction (collectively hydrocatalytically treated) favors the formation of a significant fraction of organic phase components, as opposed to aqueous soluble components. Alternately, an externally formed organic hydrocarbon-rich solvent may be deliberately added to the reaction mixture. Use of an organic hydrocarbon-rich solvent improves the solubilization of hydrogen into the reaction mixture relative to that which can be obtained with an aqueous phase solvent. It also allows for convenient recycle of the organic solvent phase via liquid-liquid separation and decant, following biomass digestion and reaction. Because biomass is most economically fed to a biofuels process as a wetted or only partially dried feedstock, and because water is formed upon catalytic addition of hydrogen to biomass and biomass-derived intermediates, physical separation of excess water and organic hydrocarbon-rich solvent after the digestion and reaction step, is a process advantage in requiring less energy and equipment, relative to the use of thermal distillation to separate solvents from water in a aqueous solvent-based process.

The process is therefore more energy efficient and more effective in hydrocatalytic processing, including hydrogenation, hydrodeoxygenation and hydrogenolysis of biomass-derived intermediates, than a comparable process conducted in the presence of a fully water miscible, aqueous solvent mixture.

The organic-rich layer (organic phase) may be produced as intermediate products from hydrocatalytic treatment under organic phase hydrothermal conditions, and typically have a dielectric constant of greater than about 2, and are effective in assisting the digestion, hydrolysis and organic phase hydrocatalytic conversion of biomass-derived intermediates, via ability to solubilize water and ionic intermediates.

Suitable organic solvent mixtures will exhibit only partial miscibility when contacted with water, such that a second liquid phase is formed in the presence of water at least for some temperature between ambient (20° C.) and 300° C., and for at least a fraction of water between 0% and 100%. Partial miscibility enables at least some components of the solvent mixture to be conveniently recycled by liquid decant from a liquid-liquid or liquid-liquid-vapor contactor. The partially water miscible, organic solvent mixture will be comprised of one or more individual components which have only partial solubility in water, as referenced by C. L. Yaws, *Chemical Properties Handbook*, McGraw-Hill, NY (1999), Table 15-1. Some components of the mixture may be fully miscible or soluble with water at room temperature, for example propanol, ethanol, acetone, acetic acid, acetaldehyde, ethylene glycol, tetrahydrofuran, but the mixture must also contain a sufficient concentration of components containing only partial water miscibility such as n-butanol, n-pentanol, n-hexanol, n-octanol, aldehydes or ketones of $C_4$ or higher in carbon number, pentane, pentene and high molecular weight alkenes and alkanes, such that a second, hydrocarbon-rich organic liquid phase is formed. Propensity for individual components of the solvent mixture to partition between the hydrocarbon-rich organic phase and the excess water phase is described by their octanol-water partition coefficient (Yaws op cit.). Water will exhibit some solubility in the hydrocarbon-rich organic phase, typically above about 1 weight percent. Dielectric constant for the hydrocarbon-rich organic phase will be greater than about 2, but less than about 15, to comprise a solvent mixture of moderate polarity. The solvent provides for a finite solubility of carbohydrate intermediates such as glucose, fructose, mannose, xylose, xylitol, and sorbitol.

Water miscibility of organic hydrocarbon solvent mixtures is determined from empirical observation, and modeled using two-component activity coefficient models such as the Non Random Two Liquid (NTRL) model [Renon H., Prausnitz J. M., "Local Compositions in Thermodynamic Excess Functions for Liquid Mixtures", AIChE J., 14(1), S.135-144, 1968]. While individual constituents of an organic hydrocarbon-rich phase may be fully miscible with water at ambient temperature, the mixture as an ensemble will form a phase which is not fully miscible, but forms a liquid-liquid interface with finite interfacial tension, between the organic hydrocarbon-rich phase, and the aqueous water-rich phase. Individual constituents will partition between the organic and aqueous phases, according to thermodynamic equilibrium. Prediction of miscibility may be based upon correlation of cohesive energy difference for individual components as correlated by the Hildebrand solubility parameter (Hildebrand, J. H. The Solubility of Non-Electrolytes; New York: Reinhold, 1936.], adapted to consider dispersion, polar, and hydrogen bonding components by Hanson (Hansen, Charles (2007). *Hansen Solubility Parameters: A user's handbook, Second Edition*. Boca Raton, Fla.: CRC Press]) An essential feature of the current inventive process is that digestion of biomass and hydrocatalytic reactions are conducted in the presence of a organic hydrocarbon rich phase which is not fully miscible with water and forms a second aqueous phase where water is present at 1:1 by mass ratio, at ambient temperature.

In one embodiment, biomass feedstock is contacted with an organic solvent having partial water miscibility to form a digested biomass stream. The digested biomass stream is contacted with hydrogen in the presence of a metal catalyst effective at activating molecular hydrogen (hydrocatalytic treatment) also referred as molecular hydrogen activating catalyst, to form a hydrocatalytically treated mixture that contains a plurality of hydrocarbon and oxygenated hydrocarbon molecules, where at least a portion of the organic solvent may be recycled from the organic phase of the intermediate product. The intermediate product (hydrocatalytically treated mixture) is phase separated by liquid-liquid separation, into an organic hydrocarbon-rich phase typically having a dielectric constant of greater than about 2, and a water phase comprising water soluble oxygenated hydrocarbons. At least a portion of the water phase containing the water soluble oxygenated hydrocarbons, and optionally at least a portion of the oxygenated hydrocarbon molecules in the organic phase, or both, are processed to form a fuel blend comprising higher hydrocarbons.

During digestion of biomass and hydrocatalytic reactions including reforming of carbohydrates to make hydrogen, if not already present, hydrogenation, hydrogenolysis, and hydrodeoxygenation, and other reactions, components such as alcohols or ketones greater than $C_4$ which are not fully water miscible across all concentration ranges, can form, to produce an organic phase. For this invention, the organic phase is recycled to a biomass digester and hydrocatalytic reactor, to effect "organic phase hydrocatalytic treatment". The organic phase may result directly from the selective formation of reaction products from hydrocatalytic reaction steps, including hydrogenation, hydrogenolysis, and hydrodeoxygenation. Further reaction of these intermediates via condensation and oligomerization reactions can also occur during hydrocatalytic processing, to render additional reaction intermediates which have on partial miscibility with water, and which can be used to form the organic phase solvent. This phase is separated via a liquid-liquid phase separator and decanter.

If separation of an aqueous rich phase is not observed directly in the reactor outlet as a result of the reaction product selectivities, reduction in temperature after reaction can lead to formation of separate organic-rich and aqueous phases, via "Temperature induced phase separation" (TIPS). Alternately, an external solvent may be added (alkane, aromatic) that is not fully miscible with water, which can lead to a second phase forming in the liquid-liquid separator (Concentration Induced Phase Separation), insuring the ability to recycle an organic-rich solvent phase. If the water concentration is not sufficient to induce formation of a second liquid phase after reaction, water may be added to extract a portion of the water soluble components, and induce a phase separation to enable recycle of an organic hydrocarbon-rich phase.

In one preferred embodiment, the digestion of biomass and hydrocatalytic reactions are conducted in the presence of a single, organic phase, with no separate aqueous phase observed until after the reaction step. This may be facilitated by recycling light oxygenated solvents from the aqueous coproduct stream (ethanol, isopropanol, propanol, acetone). Use of flash distillation to recycle light (<C4) oxygenated solvents will enable the water and polyol components of digested biomass to be dissolved into the recycle organic solvent mixture, without forming a second aqueous rich phase until cool down to induce TIPS, extraction with excess water, or flash of the solvent mixture to remove the miscibilizing light oxygenated solvent.

In the invention, it is important to recycle an "organic phase" to effect digestion of biomass and act as solvent for the hydrocatalytic reactions, where "organic phase" is defined as a phase where the ratio of water to organic components is less than 1:1, and where two liquid phases are formed upon equilibrating at ambient temperature, if the mass ratio of organic solvent components to water is greater than 1:1. Equilibration entails intimate mixing or other means of contacting to assure that thermodynamic equilibrium is obtained throughout the mixture, and across any phase boundaries which may form.

The FIGURE schematically describes one embodiment of the formation and recycle of the organic phase. The FIGURE shows optional flash distillation of the aqueous coproduct stream to recycle a light miscibilizing solvent to blend with the organic phase recycle stream. Separation of an organic rich layer is achieved via cooling prior to the liquid-liquid separator (TIPS), or addition of a water-rich stream as "water extractant" (CIPS). In such embodiment, 100, biomass feedstock 1 is provided to digestion system 10 that may have one or more digester(s), whereby the biomass is contacted with an organic solvent exhibiting partial miscibility with water at 25° C. thereby forming a digested biomass stream. The organic solvent may contain make-up solvent 3 and recycled organic hydrocarbon-rich phase 35. Water is generally present in the organic phase solvent mixture, at a concentration of less than 50 weight percent, most typically less than 15 weight percent. Contacting of the organic solvent with the biomass feedstock in digestive system 10 results in formation of digested biomass stream 12. At least a portion of the digested biomass stream 12 is fed to a organic phase hydrocatalytic treatment system 20 whereby the digested biomass is catalytically reacted with hydrogen (optionally external hydrogen may be added 15) in the presence of a hydrocatalytic treatment metal catalyst capable of activating molecular hydrogen, to produce a hydrocatalytically treated mixture 22 exiting the hydrocatalytic treatment system 20, containing at least one partial water miscible molecule such as, for example, n-butanol, n-pentanol, n-hexanol, n-octanol, aldehydes or ketones of $C_4$ or higher in carbon number, pentane, pentene and high molecular weight alkenes and alkanes, and the like along with other water-miscible small molecules and oxygenated molecules such as ethylene glycol, and any added or formed aromatic or hydrocarbon solvents such as toluene, benzene, or alkanes. A portion of the hydrocatalytically treated mixture 22 may be directly recycled to digester 10, to control residence time and concentrations in digestion and reaction steps. The portion of the hydrocatalytically treated mixture 22 that is not optionally recycled, is phase separated into an organic phase and water phase by liquid-liquid separation 30 to form an organic hydrocarbon-rich phase stream 32 (organic phase) and an aqueous phase stream 34. A portion (first portion) of the organic phase is recycled 35 to the digestor(s) 10. Optionally, a second portion 33 of the organic phase may be further processed to a liquid fuel blend. Light oxygenated solvents (ethanol, isopropanol, propanol, acetone) with volatility greater than water, and present in aqueous hydrocatalytically treated mixture 34 are optionally flash distilled 40 and recycled as stream 44, to further increase the solvent strength of the organic recycle stream. Aqueous bottoms stream 50 is optionally further processed to produce higher hydrocarbons, optionally together with the organic hydrocatalytically treated mixture 33.

A fraction of the hydrocatalytically treated mixture stream 22 may optionally be directly recycled to digester 10 (not shown), to provide solvent for hydrolysis and dilution the digested biomass stream 12.

Any suitable (e.g., inexpensive and/or readily available) type of biomass can be used. Suitable lignocellulosic biomass can be, for example, selected from, but not limited to, forestry residues, agricultural residues, herbaceous material, municipal solid wastes, waste and recycled paper, pulp and paper mill residues, and combinations thereof. Thus, in some embodiments, the biomass can comprise, for example, corn stover, straw, bagasse, miscanthus, sorghum residue, switch grass, bamboo, water hyacinth, hardwood, hardwood chips, hardwood pulp, softwood, softwood chips, softwood pulp, and/or combination of these feedstocks. The biomass can be chosen based upon a consideration such as, but not limited to, cellulose and/or hemicelluloses content, lignin content, growing time/season, growing location/transportation cost, growing costs, harvesting costs and the like.

Prior to treatment with the organic solvent, the undigested biomass can be washed and/or reduced in size (e.g., chopping, crushing or debarking) to a convenient size and certain quality that aids in moving the biomass or mixing and impregnating the chemicals from digestive solvent. Thus, in some embodiments, providing biomass can comprise harvesting a lignocelluloses-containing plant such as, for example, a hardwood or softwood tree. The tree can be subjected to debarking, chopping to wood chips of desirable thickness, and washing to remove any residual soil, dirt and the like.

It is recognized that washing with water prior to treatment with organic solvent is desired, to rinse and remove simple salts such as nitrate, sulfate, and phosphate salts which otherwise may be present. This wash is accomplished at a temperature of less than about 60 degrees Celsius, and where hydrolysis reactions comprising digestion do not occur to a significant extent. In the digestion system, the size-reduced biomass is contacted with the organic solvent in at least one digester where the digestion reaction takes place.

The digester can be, for example, a pressure vessel of carbon steel or stainless steel or similar alloy. The digestion system can be carried out in the same vessel or in a separate vessel. The digestion can be conducted in continuous or batch mode. The organic solvent is discussed in detail above. The contents can be kept at a temperature within the range of from 100° C. to 300° C. for a period of time, more preferably within the range from about 140° C. to about 260° C. The period of time can be from about 1 to 10 hours, preferably from about 2 to about 6 hours, after which the pretreated contents of the digester are discharged. Alternately, continuous contacting of solvent though a digester may be employed. For adequate penetration, a sufficient volume of organic solvent is required to ensure that all the biomass surfaces are wetted. Sufficient organic solvent is supplied to provide the specified solvent to bio-based feedstock ratio. The effect of greater dilution is to decrease the concentration of active biomass-derived intermediates in the reaction mixture, which increases the equipment size and process energy required to separate reaction products from both organic and aqueous solvent phases, prior to subsequent processing steps. For a continuous process, the ratio of organic hydrocarbon-rich solvent flow to biomass feed flow may be increased, to reduce the residence time of digestive intermediates in the digester, and thus reduce their degradation via undesired thermal reactions. Preferably, a pressure from about 7 bar to 200 bar, and most typically from about 15 bar to 150 bar, is maintained on the system to avoid boiling or flashing away of the solvent. The amount of water present in the biomass feedstock should be less than about 50% by weight, based on the solid biomass so that a separate water phase does not form in the digester and reactor upon formation of the digestive mixture.

In some embodiments, the reactions described are carried out in any system of suitable design, including systems comprising continuous-flow, batch, semi-batch or multi-system vessels and reactors. One or more reactions or steps may take place in an individual vessel and the process is not limited to separate reaction vessels for each reaction or digestion. In some embodiments the system of the invention utilizes a fluidized catalytic bed system. Preferably, the invention is practiced using a continuous-flow system at steady-state equilibrium.

Each reactor vessel of the invention preferably includes an inlet and an outlet adapted to remove the product stream from the vessel or reactor. In some embodiments, the vessel in which at least some digestion occurs may include additional outlets to allow for the removal of portions of the reactant stream. In some embodiments, the vessel in which at least some digestion occurs may include additional inlets to allow for additional solvents or additives.

The digestion step may occur in any contactor suitable for solid-liquid contacting. The digestion may for example be conducted in a single or multiple vessels, with biomass solids either fully immersed in liquid organic solvent, or contacted with solvent in a trickle bed or pile digestion mode. As a further example, the digestion step may occur in a continuous multizone contactor as described in U.S. Pat. No. 7,285,179 (Snekkenes et al., "Continuous Digester for Cellulose Pulp including Method and Recirculation System for such Digester"), which disclosure is hereby incorporated by reference. Alternately, the digestion may occur in a fluidized bed or stirred contactor, with suspended solids. The digestion may be conducted batch wise, in the same vessel used for prewash, post wash, and/or subsequent reaction steps. The digestion may also be conducted in a counter-flow as described in the FIGURE.

Digestion of biomass occurs in the presence of water, to effect hydrolysis reactions. A minimum of about one weight percent water is required in the digester, to effect these reactions. Water is in most cases present in the biomass feed, and is also solubilized at an equilibrium concentration in the organic solvent mixture recycled from the liquid-liquid phase separation and decant (30). Hydrolysis of cellulose and hemicelluloses in the biomass feed results in solubilization of carbohydrate components into the digested biomass stream.

The relative composition and concentration of the various carbohydrate components in the digested biomass stream affects the formation of undesirable by-products such as tars or heavy ends in the hydrogenolysis reaction. In particular, a low concentration of carbohydrates present as reducing sugars, or containing free aldehyde groups, in the digested biomass stream can minimize the formation of unwanted by-products. In preferred embodiments, it is desirable to have a concentration of no more than 5 wt %, based upon total liquid, of readily degradable carbohydrates or heavy end precursors in the treated biomass, while maintaining a total organic intermediates concentration, which can include the oxygenated intermediates (e.g., mono-oxygenates, diols, and/or polyols) derived from the carbohydrates, as high as possible, via use of concerted reaction or rapid recycle of the liquid between the digestion zone, and the hydrocatalytic reaction zone converting the solubilized carbohydrates to oxygenated intermediates.

The hydrocatalytic treatment is conducted in the presence of molecular hydrogen, with a metal catalyst that is capable of activating molecular hydrogen ("molecular hydrogen activating catalyst") to participation in reactions such as hydrogenation, hydrogenolysis, hydrodeoxygenation, optionally hydrodesulfurization and hydrodenitrification. These reactions are important for conversion of unstable reactive intermediates derived from biomass feedstocks, to a more stable form via hydrogenation reactions, and also for generation of the desired mono-oxygenate intermediates desired for subsequent condensation and oligomerization to liquid biofuels. If molecular hydrogen or $H_2$ is not present, most catalysts which can activate $H_2$ can also form $H_2$ from soluble hydrocarbons and oxygenated hydrocarbons and water, via reforming reactions. Transition metal catalysts are most typically employed for activation of molecular hydrogen.

For hydrocatalytic treatment, one suitable method includes contacting the digested biomass stream containing carbohydrate or stable hydroxyl intermediate with hydrogen or hydrogen mixed with a suitable gas and a metal catalyst capable of activating molecular hydrogen to effect hydrogenation, hydrogenolysis, hydrodeoxygenation, and optionally hydrodesulfurization and hydrodenitrification reactions under conditions effective to form a reaction product comprising less reactive, smaller molecules or polyols and other oxygenated compounds. As used herein, the term "smaller molecules or polyols and other oxygenated compounds"

includes any molecule that has a lower molecular weight, which can include a smaller number of carbon atoms or oxygen atoms than the starting carbohydrate. Less reactive refers to the conversion of aldehydic carbonyls, to alcohols. In an embodiment, the reaction products include smaller molecules that include polyols and alcohols. This aspect of hydrogenolysis entails breaking of carbon-carbon bonds, where hydrogen is supplied to satisfy bonding requirements for the resulting smaller molecules, as shown for the example:

$$RC(H)_2-C(H)_2R'+H_2 \rightarrow RCH_3+H_3CR'$$

where R and R' are any organic moieties.

The conditions for which to carry out hydrocatalytic treatment including the hydrogenation and hydrogenolysis reactions will vary based on the type of biomass starting material and the desired products (e.g. gasoline or diesel). One of ordinary skill in the art, with the benefit of this disclosure, will recognize the appropriate conditions to use to carry out the reaction. In general, hydrogenation reactions will start as low as 60° C., with a typical range of 80-150° C., while the hydrogenolysis reaction is conducted at temperatures in the range of 110° C. to 300° C., and preferably of 170° C. to 300° C., and most preferably of 180° C. to 290° C.

In an embodiment, the hydrogenolysis reaction is conducted under basic conditions, preferably at a pH of 8 to 13, and even more preferably at a pH of 10 to 12. In another embodiment, the hydrogenolysis reaction is conducted under neutral to mildly acidic conditions. In an embodiment, the hydrogenolysis reaction is conducted at pressures in a range between about 1 and 200 bar, and preferably in a range between 15 and 150 bar, and even more preferably between 35 bar and 100 bar.

The hydrogen used in the hydrogenolysis reaction of the current invention can include external hydrogen, recycled hydrogen, in situ generated hydrogen, and any combination thereof.

In an embodiment, the use of a hydrogenolysis reaction may produce less carbon dioxide as a byproduct, and a greater amount of polyols than a reaction that results in reforming of the carbohydrate reactants to generate hydrogen. For example, reforming can be illustrated by formation of isopropanol (i.e., IPA, or 2-propanol) from sorbitol:

$$C_6H_{14}O_6+H_2O \rightarrow 4H_2+3CO_2+C_3H_8O; dHR=-40 \text{ J/g-mol} \quad (Eq. 1)$$

Alternately, in the presence of hydrogen, polyols and mono-oxygenates such as IPA can be formed by hydrogenolysis and hydrodeoxygenation reactions, where hydrogen is consumed rather than produced:

$$C_6H_{14}O_6+3H_2 \rightarrow 2H_2O+2C_3H_8O_2; dHR=+81 \text{ J/gmol} \quad (Eq. 2)$$

$$C_6H_{14}O_6+5H_2 \rightarrow 4H_2O+2C_3H_8O; dHR=-339 \text{ J/gmol} \quad (Eq. 3)$$

As a result of the differences in the reaction conditions (e.g., presence of hydrogen), the products of the hydrogenolysis reaction may comprise greater than 25% by mole, or alternatively, greater than 30% by mole of polyols, which may result in a greater conversion in a subsequent processing reaction. In addition, the use of a hydrolysis reaction rather than a reaction running at reforming conditions may result in less than 20% by mole, or alternatively less than 30% by mole carbon dioxide production. As used herein, "oxygenated intermediates" generically refers to hydrocarbon compounds having one or more carbon atoms and between one and three oxygen atoms (referred to herein as C1+O1-3 hydrocarbons), such as polyols and smaller molecules (e.g., one or more polyols, alcohols, ketones, or any other hydrocarbon having at least one oxygen atom).

In an embodiment, hydrogenolysis is conducted under neutral or acidic conditions, as needed to accelerate hydrolysis reactions in addition to the hydrogenolysis. Hydrolysis of oligomeric carbohydrates may be combined with hydrogenation to produce sugar alcohols, which can undergo hydrogenolysis.

The hydrocatalytic treatment catalyst may includes a support material that has incorporated therein or is loaded with a metal component, which is or can be converted to a metal compound that has activity towards the catalytic hydrogenation, hydrogenolysis, and hydrodeoxygenation of soluble carbohydrates. The support material can comprise any suitable inorganic oxide material that is typically used to carry catalytically active metal components. Examples of possible useful inorganic oxide materials include alumina, silica, silica-alumina, magnesia, zirconia, boria, titania and mixtures of any two or more of such inorganic oxides. The preferred inorganic oxides for use in the formation of the support material are alumina, silica, silica-alumina and mixtures thereof. Most preferred, however, is alumina.

In the preparation of the hydrocatalytic treatment catalyst, the metal component of the catalyst composition may be incorporated into the support material by any suitable method or means that provides the support material that is loaded with an active metal precursor, thus, the composition includes the support material and a metal component. One method of incorporating the metal component into the support material, includes, for example, co-mulling the support material with the active metal or metal precursor to yield a co-mulled mixture of the two components. Or, another method includes the co-precipitation of the support material and metal component to form a co-precipitated mixture of the support material and metal component. Or, in a preferred method, the support material is impregnated with the metal component using any of the known impregnation methods such as incipient wetness to incorporate the metal component into the support material.

When using the impregnation method to incorporate the metal component into the support material, it is preferred for the support material to be formed into a shaped particle comprising an inorganic oxide material and thereafter loaded with an active metal precursor, preferably, by the impregnation of the shaped particle with an aqueous solution of a metal salt to give the support material containing a metal of a metal salt solution. To form the shaped particle, the inorganic oxide material, which preferably is in powder form, is mixed with water and, if desired or needed, a peptizing agent and/or a binder to form a mixture that can be shaped into an agglomerate. It is desirable for the mixture to be in the form of an extrudable paste suitable for extrusion into extrudate particles, which may be of various shapes such as cylinders, trilobes, etc. and nominal sizes such as ⅟₁₆", ⅛", ³⁄₁₆", etc. The support material of the inventive composition, thus, preferably, is a shaped particle comprising an inorganic oxide material.

The calcined shaped particle can have a surface area (determined by the BET method employing $N_2$, ASTM test method D 3037) that is in the range of from about 50 $m^2/g$ to about 450 $m^2/g$, preferably from about 75 $m^2/g$ to about 400 $m^2/g$, and, most preferably, from about 100 $m^2/g$ to about 350 $m^2/g$. The mean pore diameter in angstroms (Å) of the calcined shaped particle is in the range of from about 50 to about 200, preferably, from about 70 to about 150, and, most preferably, from about 75 to about 125. The pore volume of the calcined shaped particle is in the range of from about 0.5 cc/g to about 1.1 cc/g, preferably, from about 0.6 cc/g to about 1.0 cc/g, and, most preferably, from about 0.7 cc/g to about 0.9 cc/g. Less than ten percent (10%) of the total pore volume of the calcined shaped particle is contained in the pores having a pore diameter greater than about 350 Å, preferably, less than about 7.5% of the total pore volume of the calcined shaped particle is contained in the pores having a pore diameter greater than about 350 Å, and, most preferably, less than about 5%.

The references herein to the pore size distribution and pore volume of the calcined shaped particle are to those properties as determined by mercury intrusion porosimetry, ASTM test method D 4284. The measurement of the pore size distribution of the calcined shaped particle is by any suitable measurement instrument using a contact angle of 140° with a mercury surface tension of 474 dyne/cm at 25° C.

In one embodiment, the calcined shaped particle is impregnated in one or more impregnation steps with a metal component using one or more aqueous solutions containing at least one metal salt wherein the metal compound of the metal salt solution is an active metal or active metal precursor. The metal elements are (a) molybdenum (Mo) and (b) cobalt (Co) and/or nickel (Ni). Phosphorous (P) can also be a desired metal component. For Co and Ni, the metal salts include metal acetates, formats, citrates, oxides, hydroxides, carbonates, nitrates, sulfates, and two or more thereof. The preferred metal salts are metal nitrates, for example, such as nitrates of nickel or cobalt, or both. For Mo, the metal salts include metal oxides or sulfides. Preferred are salts containing the Mo and ammonium ion, such as ammonium heptamolybdate and ammonium dimolybdate.

The concentration of the metal compounds in the impregnation solution is selected so as to provide the desired metal content in the final composition of the hydrocatalytic treatment catalyst taking into consideration the pore volume of the support material into which the aqueous solution is to be impregnated. Typically, the concentration of metal compound in the impregnation solution is in the range of from 0.01 to 100 moles per liter.

Cobalt, nickel, or combination thereof can be present in the support material having a metal component incorporated therein in an amount in the range of from about 0.5 wt. % to about 20 wt. %, preferably from about 1 wt. % to about 15 wt. %, and, most preferably, from about 2 wt. % to about 12 wt. %, based on metals components (b) and (c) as metal oxide form; and the Molybdenum can be present in the support material having a metal component incorporated therein in an amount in the range of from about 2 wt. % to about 50 wt. %, preferably from about 5 wt. % to about 40 wt. %, and, most preferably, from about 12 wt. % to about 30 wt. %, based on metals components (b) and (c) as metal oxide form. The above-referenced weight percents for the metal components are based on the dry support material and the metal component as the element (change "element" to "metal oxide form"?) regardless of the actual form of the metal component.

The metal loaded catalyst may be sulfided prior to its loading into a reactor vessel or system for its use as hydrocatalytic treatment catalyst or may be sulfided, in situ, in a gas phase or liquid phase activation procedure. In one embodiment, the liquid soluble carbohydrate feedstock can be contacted with a sulfur-containing compound, which can be hydrogen sulfide or a compound that is decomposable into hydrogen sulfide, under the contacting conditions of the invention. Examples of such decomposable compounds include mercaptans, $CS_2$, thiophenes, dimethyl sulfide (DMS), dimethyl sulfoxide (DMSO), sodium hydrogen sulfate, and dimethyl disulfide (DMDS). Also, preferably, the sulfiding is accomplished by contacting the hydrogen treated composition, under suitable sulfurization treatment conditions, with a suitable feedsource that contains a concentration of a sulfur compound. The sulfur compound of the hydrocarbon feedstock can be an organic sulfur compound, particularly, one that is derived from the biomass feedstock or other sulfur containing amino-acids such as Cysteine.

Suitable sulfurization treatment conditions are those which provide for the conversion of the active metal components of the precursor hydrogenolysis catalyst to their sulfided form. Typically, the sulfiding temperature at which the precursor hydrogenolysis catalyst is contacted with the sulfur compound is in the range of from about 150° C. to about 450° C., preferably, from about 175° C. to about 425° C., and, most preferably, from about 200° C. to about 400° C.

When using a soluble carbohydrate feedstock that is to be treated using the catalyst to sulfide, the sulfurization conditions can be the same as the process conditions under which the hydrogenolysis is performed. The sulfiding pressure generally can be in the range of from about 1 bar to about 70 bar, preferably, from about 1.5 bar to about 55 bar, and, most preferably, from about 2 bar to about 35 bar. The resulting active catalyst typically has incorporated therein sulfur content in an amount in the range of from about 0.1 wt. % to about 40 wt. %, preferably from about 1 wt. % to about 30 wt. %, and, most preferably, from about 3 wt. % to about 24 wt. %, based on metals components (b) and (c) as metal oxide form.

In some embodiments, the hydrocatalytic treatment catalysts can be a heterogeneous catalyst capable of catalyzing a reaction between hydrogen and carbohydrate, oxygenated intermediate, or both to remove one or more oxygen atoms to produce alcohols and polyols to be fed to the condensation reactor. The hydrocatalytic treatment catalyst can generally include Cu, Re, Ni, Fe, Co, Ru, Pd, Rh, Pt, Os, Ir, Sn, and alloys or any combination thereof, either alone or with promoters such as W, Mo, Au, Ag, Cr, Zn, Mn, B, P, Bi, and alloys or any combination thereof. Other effective Hydrocatalytic treatment catalyst materials include either supported nickel or ruthenium modified with rhenium. In some embodiments, the Hydrocatalytic treatment catalyst also includes any one of the supports, depending on the desired functionality of the catalyst. The Hydrocatalytic treatment catalysts may be prepared by methods known to those of ordinary skill in the art. In some embodiments the Hydrocatalytic treatment catalyst includes a supported Group VIII metal catalyst and a metal sponge material (e.g., a sponge nickel catalyst). Raney nickel provides an example of an activated sponge nickel catalyst suitable for use in this invention. In some embodiments, the hydrocatalytic treatment in the invention is performed using a catalyst comprising a nickel-rhenium catalyst or a tungsten-modified nickel catalyst. One example of a suitable catalyst for the hydrocatalytic treatment of the invention is a carbon-supported nickel-rhenium catalyst.

In some embodiments, a suitable Raney nickel catalyst may be prepared by treating an alloy of approximately equal amounts by weight of nickel and aluminum with an aqueous alkali solution, e.g., containing about 25 weight % of sodium hydroxide. The aluminum is selectively dissolved by the aqueous alkali solution resulting in a sponge shaped material comprising mostly nickel with minor amounts of aluminum. The initial alloy includes promoter metals (e.g., molybdenum or chromium) in the amount such that 1 to 2 weight % remains in the formed sponge nickel catalyst. In another embodiment, the Hydrocatalytic treatment catalyst is prepared using a solution of ruthenium(III) nitrosylnitrate, ruthenium (III) chloride in water to impregnate a suitable support material. The solution is then dried to form a solid having a water content of less than 1% by weight. The solid is then reduced at atmospheric pressure in a hydrogen stream at 300° C. (uncalcined) or 400° C. (calcined) in a rotary ball furnace for 4 hours. After cooling and rendering the catalyst inert with nitrogen, 5% by volume of oxygen in nitrogen is passed over the catalyst for 2 hours.

In certain embodiments, the hydrocatalytic treatment catalyst may include a catalyst support. The catalyst support stabilizes and supports the catalyst. The type of catalyst support used depends on the chosen catalyst and the reaction conditions. Suitable supports for the invention include, but are not limited to, carbon, silica, silica-alumina, zirconia, titania, ceria, vanadia, nitride, boron nitride, heteropolyacids, hydroxyapatite, zinc oxide, chromia, zeolites, carbon nanotubes, carbon fullerene and any combination thereof.

In an embodiment of the invention, the digested biomass stream containing carbohydrates may be converted into an stable hydroxyl intermediate comprising the corresponding alcohol derivative through a hydrogenolysis reaction in addition to an optional hydrogenation reaction in a suitable reaction vessel (such as hydrogenation reaction as described in United States patent publication no. 20110154721 and co-pending United States patent publication no. US20110282115, which disclosures are hereby incorporated by reference).

The hydrocatalytically treated mixture then passes from the hydrocatalytic treatment system to at least one liquid-liquid separator to separate the organic phase and the water phase as described above. Any water phase and organic phase liquid-liquid separation technique can be used. The phase may phase form directly in the reactor outlet as a result of the reaction product selectivities, reduction in temperature after reaction via "Temperature induced phase separation" (TIPS), use of liquid-liquid coalescers, or by adding external solvent (alkane, aromatic) that is not fully miscible with water, which can lead to a second phase forming in the liquid-liquid separator (Concentration Induced Phase Separation) such as described in detail in "Liquid-Liquid Extraction Using the Composition-Induced Phase Separation Process," Ind. Eng. Chem. Res. 1996, 35, 2360-2368.

At least a portion of the aqueous phase stream, and optionally at least a portion of the organic phase stream, containing oxygenated intermediates may then pass to further processing stage. In addition, an outlet stream from the separation stage can also be used to remove some or all of the lignin from the oxygenated hydrocatalytically treated mixture. The lignin may be passed out of the separation stage as a separate stream, for example as output stream.

In some embodiments, the oxygenated hydrocarbon molecules and hydrocarbon molecules in the hydrocatalytically treated mixtures (intermediates), whether via organic hydrocarbon-rich phase and/or aqueous phase (can be converted into higher hydrocarbons through a processing reaction shown schematically as processing reaction. In an embodiment, the processing reaction may comprise a condensation reaction to produce a fuel blend. In an embodiment, the higher hydrocarbons may be part of a fuel blend for use as a transportation fuel. In such an embodiment, condensation of the oxygenated intermediates occurs in the presence of a catalyst capable of forming higher hydrocarbons. While not intending to be limited by theory, it is believed that the production of higher hydrocarbons proceeds through a stepwise addition reaction including the formation of carbon-carbon bond. The resulting reaction products include any number of compounds, as described in more detail below.

In some embodiments, an outlet stream containing at least a portion of the intermediates can pass to a processing reaction or processing reactions. Suitable processing reactions may comprise a variety of catalysts for condensing one or more intermediates to higher hydrocarbons, defined as hydrocarbons containing more carbons than the precursors. The higher hydrocarbons may comprise a fuel product. The fuel products produced by the processing reactions represent the product stream from the overall process at higher hydrocarbon stream. In an embodiment, the oxygen to carbon ratio of the higher hydrocarbons produced through the processing reactions is less than 0.5, alternatively less than 0.4, or preferably less than 0.3.

The intermediates can be processed to produce a fuel blend in one or more processing reactions. In an embodiment, a condensation reaction can be used along with other reactions to generate a fuel blend and may be catalyzed by a catalyst comprising acid or basic functional sites, or both. In general, without being limited to any particular theory, it is believed that the basic condensation reactions generally consist of a series of steps involving: (1) an optional dehydrogenation reaction; (2) an optional dehydration reaction that may be acid catalyzed; (3) an aldol condensation reaction; (4) an optional ketonization reaction; (5) an optional furanic ring opening reaction; (6) hydrogenation of the resulting condensation products to form a C4+ hydrocarbon; and (7) any combination thereof. Acid catalyzed condensations may similarly entail optional hydrogenation or dehydrogenation reactions, dehydration, and oligomerization reactions. Additional polishing reactions may also be used to conform the product to a specific fuel standard, including reactions conducted in the presence of hydrogen and a hydrogenation catalyst to remove functional groups from final fuel product. A catalyst comprising a basic functional site, both an acid and a basic functional site, and optionally comprising a metal function, may be used to effect the condensation reaction.

In an embodiment, the aldol condensation reaction may be used to produce a fuel blend meeting the requirements for a diesel fuel or jet fuel. Traditional diesel fuels are petroleum distillates rich in paraffinic hydrocarbons. They have boiling ranges as broad as 187° C. to 417° C., which are suitable for combustion in a compression ignition engine, such as a diesel engine vehicle. The American Society of Testing and Materials (ASTM) establishes the grade of diesel according to the boiling range, along with allowable ranges of other fuel properties, such as cetane number, cloud point, flash point, viscosity, aniline point, sulfur content, water content, ash content, copper strip corrosion, and carbon residue. Thus, any fuel blend meeting ASTM D975 can be defined as diesel fuel.

The present invention also provides methods to produce jet fuel. Jet fuel is clear to straw colored. The most common fuel is an unleaded/paraffin oil-based fuel classified as Aeroplane A-1, which is produced to an internationally standardized set of specifications. Jet fuel is a mixture of a large number of different hydrocarbons, possibly as many as a thousand or more. The range of their sizes (molecular weights or carbon numbers) is restricted by the requirements for the product, for example, freezing point or smoke point. Kerosene-type Airplane fuel (including Jet A and Jet A-1) has a carbon number distribution between about C8 and C 16. Wide-cut or naphtha-type Airplane fuel (including Jet B) typically has a carbon number distribution between about C5 and C15. A fuel blend meeting ASTM D1655 can be defined as jet fuel.

In certain embodiments, both Airplanes (Jet A and Jet B) contain a number of additives. Useful additives include, but are not limited to, antioxidants, antistatic agents, corrosion inhibitors, and fuel system icing inhibitor (FSII) agents. Antioxidants prevent gumming and usually, are based on alkylated phenols, for example, AO-30, AO-31, or AO-37. Antistatic agents dissipate static electricity and prevent sparking. Stadis 450 with dinonylnaphthylsulfonic acid (DINNSA) as the active ingredient, is an example. Corrosion inhibitors, e.g., DCI-4A are used for civilian and military fuels and DCI-6A is used for military fuels. FSII agents, include, e.g., Di-EGME.

In an embodiment, the intermediates may comprise a carbonyl-containing compound that can take part in a base catalyzed condensation reaction. In some embodiments, an optional dehydrogenation reaction may be used to increase the amount of carbonyl-containing compounds in the oxygenated hydrocatalytically treated mixture to be used as a feed to the condensation reaction. In these embodiments, the intermediates and/or a portion of the biomass feedstock stream can be dehydrogenated in the presence of a catalyst.

In an embodiment, a dehydrogenation catalyst may be preferred for an oxygenated hydrocatalytically treated mixture comprising alcohols, diols, and triols. In general, alcohols cannot participate in aldol condensation directly. The hydroxyl group or groups present can be converted into carbonyls (e.g., aldehydes, ketones, etc.) in order to participate in an aldol condensation reaction. A dehydrogenation catalyst may be included to effect dehydrogenation of any alcohols, diols, or polyols present to form ketones and aldehydes. The dehydration catalyst is typically formed from the same metals as used for hydrogenation, hydrogenolysis, or aqueous phase reforming, which catalysts are described in more detail above. Dehydrogenation yields are enhanced by the removal or consumption of hydrogen as it forms during the reaction. The dehydrogenation step may be carried out as a separate reaction step before an aldol condensation reaction, or the dehydrogenation reaction may be carried out in concert with the aldol condensation reaction. For concerted dehydrogenation and aldol condensation, the dehydrogenation and aldol condensation functions can be on the same catalyst. For example, a metal hydrogenation/dehydrogenation functionality may be present on catalyst comprising a basic functionality.

The dehydrogenation reaction may result in the production of a carbonyl-containing compound. Suitable carbonyl-containing compounds include, but are not limited to, any compound comprising a carbonyl functional group that can form carbanion species or can react in a condensation reaction with a carbanion species, where "carbonyl" is defined as a carbon atom doubly-bonded to oxygen. In an embodiment, a carbonyl-containing compound can include, but is not limited to, ketones, aldehydes, furfurals, hydroxy carboxylic acids, and, carboxylic acids. The ketones may include, without limitation, hydroxyketones, cyclic ketones, diketones, acetone, propanone, 2-oxopropanal, butanone, butane-2,3-dione, 3-hydroxybutane-2-one, pentanone, cyclopentanone, pentane-2,3-dione, pentane-2,4-dione, hexanone, cyclohexanone, 2-methyl-cyclopentanone, heptanone, octanone, nonanone, decanone, undecanone, dodecanone, methylglyoxal, butanedione, pentanedione, diketohexane, dihydroxyacetone, and isomers thereof. The aldehydes may include, without limitation, hydroxyaldehydes, acetaldehyde, glyceraldehyde, propionaldehyde, butyraldehyde, pentanal, hexanal, heptanal, octanal, nonal, decanal, undecanal, dodecanal, and isomers thereof. The carboxylic acids may include, without limitation, formic acid, acetic acid, propionic acid, butanoic acid, pentanoic acid, hexanoic acid, heptanoic acid, isomers and derivatives thereof, including hydroxylated derivatives, such as 2-hydroxybutanoic acid and lactic acid. Furfurals include, without limitation, hydroxylmethylfurfural, 5-hydroxymethyl-2(5H)-furanone, dihydro-5-(hydroxymethyl)-2(3H)-furanone, tetrahydro-2-furoic acid, dihydro-5-(hydroxymethyl)-2(3H)-furanone, tetrahydrofurfuryl alcohol, 1-(2-furyl)ethanol, hydroxymethyltetrahydrofurfural, and isomers thereof. In an embodiment, the dehydrogenation reaction results in the production of a carbonyl-containing compound that is combined with the intermediates to become a part of the intermediates fed to the condensation reaction.

In an embodiment, an acid catalyst may be used to optionally dehydrate at least a portion of the oxygenated hydrocatalytically treated mixture. Suitable acid catalysts for use in the dehydration reaction include, but are not limited to, mineral acids (e.g., HCl, $H_2SO_4$), solid acids (e.g., zeolites, ion-exchange resins) and acid salts (e.g., $LaCl_3$). Additional acid catalysts may include, without limitation, zeolites, carbides, nitrides, zirconia, alumina, silica, aluminosilicates, phosphates, titanium oxides, zinc oxides, vanadium oxides, lanthanum oxides, yttrium oxides, scandium oxides, magnesium oxides, cerium oxides, barium oxides, calcium oxides, hydroxides, heteropolyacids, inorganic acids, acid modified resins, base modified resins, and any combination thereof. In some embodiments, the dehydration catalyst can also include a modifier. Suitable modifiers include La, Y, Sc, P, B, Bi, Li, Na, K, Rb, Cs, Mg, Ca, Sr, Ba, and any combination thereof. The modifiers may be useful, inter alia, to carry out a concerted hydrogenation/dehydrogenation reaction with the dehydration reaction. In some embodiments, the dehydration catalyst can also include a metal. Suitable metals include Cu, Ag, Au, Pt, Ni, Fe, Co, Ru, Zn, Cd, Ga, In, Rh, Pd, Ir, Re, Mn, Cr, Mo, W, Sn, Os, alloys, and any combination thereof. The dehydration catalyst may be self supporting, supported on an inert support or resin, or it may be dissolved in solution.

In some embodiments, the dehydration reaction occurs in the vapor phase. In other embodiments, the dehydration reaction occurs in the liquid phase. For liquid phase dehydration reactions, an aqueous solution may be used to carry out the reaction. In an embodiment, other solvents in addition to water, are used to form the aqueous solution. For example, water soluble organic solvents may be present. Suitable solvents can include, but are not limited to, hydroxymethylfurfural (HMF), dimethylsulfoxide (DMSO), 1-methyl-n-pyrollidone (NMP), and any combination thereof. Other suitable aprotic solvents may also be used alone or in combination with any of these solvents.

In an embodiment, the processing reactions may comprise an optional ketonization reaction. A ketonization reaction may increase the number of ketone functional groups within at least a portion of the oxygenated hydrocatalytically treated mixture. For example, an alcohol or other hydroxyl functional group can be converted into a ketone in a ketonization reaction. Ketonization may be carried out in the presence of a base catalyst. Any of the base catalysts described above as the basic component of the aldol condensation reaction can be used to effect a ketonization reaction. Suitable reaction conditions are known to one of ordinary skill in the art and generally correspond to the reaction conditions listed above with respect to the aldol condensation reaction. The ketonization reaction may be carried out as a separate reaction step, or it may be carried out in concert with the aldol condensation reaction. The inclusion of a basic functional site on the aldol condensation catalyst may result in concerted ketonization and aldol condensation reactions.

In an embodiment, the processing reactions may comprise an optional furanic ring opening reaction. A furanic ring opening reaction may result in the conversion of at least a portion of any intermediates comprising a furanic ring into compounds that are more reactive in an aldol condensation reaction. A furanic ring opening reaction may be carried out in the presence of an acidic catalyst. Any of the acid catalysts described above as the acid component of the aldol condensation reaction can be used to effect a furanic ring opening reaction. Suitable reaction conditions are known to one of ordinary skill in the art and generally correspond to the reaction conditions listed above with respect to the aldol condensation reaction. The furanic ring opening reaction may be carried out as a separate reaction step, or it may be carried out in concert with the aldol condensation reaction. The inclusion of an acid functional site on the aldol condensation catalyst may result in a concerted furanic ring opening reaction and aldol condensation reactions. Such an embodiment may be advantageous as any furanic rings can be opened in the presence of an acid functionality and reacted in an aldol condensation reaction using a base functionality. Such a concerted reaction scheme may allow for the production of a greater amount of higher hydrocarbons to be formed for a given oxygenated intermediate feed.

In an embodiment, production of a C4+ compound occurs by condensation, which may include aldol-condensation, of the intermediates in the presence of a condensation catalyst. Aldol-condensation generally involves the carbon-carbon coupling between two compounds, at least one of which may contain a carbonyl group, to form a larger organic molecule. For example, acetone may react with hydroxymethylfurfural to form a C9 species, which may subsequently react with another hydroxymethylfurfural molecule to form a C15 species. The reaction is usually carried out in the presence of a condensation catalyst. The condensation reaction may be carried out in the vapor or liquid phase. In an embodiment, the reaction may take place at a temperature in the range of from about 7° C. to about 377° C., depending on the reactivity of the carbonyl group.

The condensation catalyst will generally be a catalyst capable of forming longer chain compounds by linking two molecules through a new carbon-carbon bond, such as a basic catalyst, a multi-functional catalyst having both acid and base functionality, or either type of catalyst also comprising an optional metal functionality. In an embodiment, the multi-functional catalyst will be a catalyst having both a strong acid and a strong base functionality. In an embodiment, aldol catalysts can comprise Li, Na, K, Cs, B, Rb, Mg, Ca, Sr, Si, Ba, Al, Zn, Ce, La, Y, Sc, Y, Zr, Ti, hydrotalcite, zinc-aluminate, phosphate, base-treated aluminosilicate zeolite, a basic resin, basic nitride, alloys or any combination thereof. In an embodiment, the base catalyst can also comprise an oxide of Ti, Zr, V, Nb, Ta, Mo, Cr, W, Mn, Re, Al, Ga, In, Co, Ni, Si, Cu, Zn, Sn, Cd, Mg, P, Fe, or any combination thereof. In an embodiment, the condensation catalyst comprises mixed-oxide base catalysts. Suitable mixed-oxide base catalysts can comprise a combination of magnesium, zirconium, and oxygen, which may comprise, without limitation: Si—Mg—O, Mg—Ti—O, Y—Mg—O, Y—Zr—O, Ti—Zr—O, Ce—Zr—O, Ce—Mg—O, Ca—Zr—O, La—Zr—O, B—Zr—O, La—Ti—O, B—Ti—O, and any combinations thereof. Different atomic ratios of Mg/Zr or the combinations of various other elements constituting the mixed oxide catalyst may be used ranging from about 0.01 to about 50. In an embodiment, the condensation catalyst further includes a metal or alloys comprising metals, such as Cu, Ag, Au, Pt, Ni, Fe, Co, Ru, Zn, Cd, Ga, In, Rh, Pd, Ir, Re, Mn, Cr, Mo, W, Sn, Bi, Pb, Os, alloys and combinations thereof. Such metals may be preferred when a dehydrogenation reaction is to be carried out in concert with the aldol condensation reaction. In an embodiment, preferred Group IA materials include Li, Na, K, Cs and Rb. In an embodiment, preferred Group IIA materials include Mg, Ca, Sr and Ba. In an embodiment, Group IIB materials include Zn and Cd. In an embodiment, Group IIIB materials include Y and La. Basic resins include resins that exhibit basic functionality. The base catalyst may be self-supporting or adhered to any one of the supports further described below, including supports containing carbon, silica, alumina, zirconia, titania, vanadia, ceria, nitride, boron nitride, heteropolyacids, alloys and mixtures thereof.

In one embodiment, the condensation catalyst is derived from the combination of MgO and Al2O3 to form a hydrotalcite material. Another preferred material contains ZnO and Al2O3 in the form of a zinc aluminate spinel. Yet another preferred material is a combination of ZnO, Al2O3, and CuO. Each of these materials may also contain an additional metal function provided by a Group VIIIB metal, such as Pd or Pt. Such metals may be preferred when a dehydrogenation reaction is to be carried out in concert with the aldol condensation reaction. In one embodiment, the base catalyst is a metal oxide containing Cu, Ni, Zn, V, Zr, or mixtures thereof. In another embodiment, the base catalyst is a zinc aluminate metal containing Pt, Pd Cu, Ni, or mixtures thereof.

Preferred loading of the primary metal in the condensation catalyst is in the range of 0.10 wt % to 25 wt %, with weight percentages of 0.10% and 0.05% increments between, such as 1.00%, 1.10%, 1.15%, 2.00%, 2.50%, 5.00%, 10.00%, 12.50%, 15.00% and 20.00%. The preferred atomic ratio of the second metal, if any, is in the range of 0.25-to-1 to 10-to-1, including ratios there between, such as 0.50, 1.00, 2.50, 5.00, and 7.50-to-1.

In some embodiments, the base catalyzed condensation reaction is performed using a condensation catalyst with both an acid and base functionality. The acid-aldol condensation catalyst may comprise hydrotalcite, zinc-aluminate, phosphate, Li, Na, K, Cs, B, Rb, Mg, Si, Ca, Sr, Ba, Al, Ce, La, Sc, Y, Zr, Ti, Zn, Cr, or any combination thereof. In further embodiments, the acid-base catalyst may also include one or more oxides from the group of Ti, Zr, V, Nb, Ta, Mo, Cr, W, Mn, Re, Al, Ga, In, Fe, Co, Ir, Ni, Si, Cu, Zn, Sn, Cd, P, and combinations thereof. In an embodiment, the acid-base catalyst includes a metal functionality provided by Cu, Ag, Au, Pt, Ni, Fe, Co, Ru, Zn, Cd, Ga, In, Rh, Pd, Ir, Re, Mn, Cr, Mo, W, Sn, Os, alloys or combinations thereof. In one embodiment, the catalyst further includes Zn, Cd or phosphate. In one embodiment, the condensation catalyst is a metal oxide containing Pd, Pt, Cu or Ni, and even more preferably an aluminate or zirconium metal oxide containing Mg and Cu, Pt, Pd or Ni. The acid-base catalyst may also include a hydroxyapatite (HAP) combined with any one or more of the above metals. The acid-base catalyst may be self-supporting or adhered to any one of the supports further described below, including supports containing carbon, silica, alumina, zirconia, titania, vanadia, ceria, nitride, boron nitride, heteropolyacids, alloys and mixtures thereof.

In an embodiment, the condensation catalyst may also include zeolites and other microporous supports that contain Group IA compounds, such as Li, NA, K, Cs and Rb. Preferably, the Group IA material is present in an amount less than that required to neutralize the acidic nature of the support. A metal function may also be provided by the addition of group VIIIB metals, or Cu, Ga, In, Zn or Sn. In one embodiment, the condensation catalyst is derived from the combination of MgO and Al2O3 to form a hydrotalcite material. Another preferred material contains a combination of MgO and ZrO2, or a combination of ZnO and Al2O3. Each of these materials may also contain an additional metal function provided by copper or a Group VIIIB metal, such as Ni, Pd, Pt, or combinations of the foregoing.

If a Group IIB, VIIB, VIIB, VIIIB, IIA or IVA metal is included in the condensation catalyst, the loading of the metal is in the range of 0.10 wt % to 10 wt %, with weight percentages of 0.10% and 0.05% increments between, such as 1.00%, 1.10%, 1.15%, 2.00%, 2.50%, 5.00% and 7.50%, etc. If a second metal is included, the preferred atomic ratio of the second metal is in the range of 0.25-to-1 to 5-to-1, including ratios there between, such as 0.50, 1.00, 2.50 and 5.00-to-1.

The condensation catalyst may be self-supporting (i.e., the catalyst does not need another material to serve as a support), or may require a separate support suitable for suspending the catalyst in the reactant stream. One exemplary support is silica, especially silica having a high surface area (greater than 100 square meters per gram), obtained by sol-gel synthesis, precipitation, or fuming. In other embodiments, particularly when the condensation catalyst is a powder, the catalyst system may include a binder to assist in forming the catalyst into a desirable catalyst shape. Applicable forming processes include extrusion, pelletization, oil dropping, or other known processes. Zinc oxide, alumina, and a peptizing agent may also be mixed together and extruded to produce a formed material. After drying, this material is calcined at a temperature appropriate for formation of the catalytically active phase, which usually requires temperatures in excess of 452° C. Other catalyst supports as known to those of ordinary skill in the art may also be used.

In some embodiments, a dehydration catalyst, a dehydrogenation catalyst, and the condensation catalyst can be present in the same reactor as the reaction conditions overlap to some degree. In these embodiments, a dehydration reaction and/or a dehydrogenation reaction may occur substantially simultaneously with the condensation reaction. In some embodiments, a catalyst may comprise active sites for a dehydration reaction and/or a dehydrogenation reaction in addition to a condensation reaction. For example, a catalyst may comprise active metals for a dehydration reaction and/or a dehydrogenation reaction along with a condensation reaction at separate sites on the catalyst or as alloys. Suitable active elements can comprise any of those listed above with respect to the dehydration catalyst, dehydrogenation catalyst, and the condensation catalyst. Alternately, a physical mixture of dehydration, dehydrogenation, and condensation catalysts could be employed. While not intending to be limited by theory, it is believed that using a condensation catalyst comprising a metal and/or an acid functionality may assist in pushing the equilibrium limited aldol condensation reaction towards completion. Advantageously, this can be used to effect multiple condensation reactions with dehydration and/or dehydrogenation of intermediates, in order to form (via condensation, dehydration, and/or dehydrogenation) higher molecular weight oligomers as desired to produce jet or diesel fuel.

The specific C4+ compounds produced in the condensation reaction will depend on various factors, including, without limitation, the type of intermediates in the reactant stream, condensation temperature, condensation pressure, the reactivity of the catalyst, and the flow rate of the reactant stream as it affects the space velocity, GHSV and WHSV. Preferably, the reactant stream is contacted with the condensation catalyst at a WHSV that is appropriate to produce the desired hydrocarbon products. The WHSV is preferably at least about 0.1 grams of intermediates in the reactant stream per hour, more preferably the WHSV is between about 0.1 to 40.0 g/g hr, including a WHSV of about 1, 2, 3, 4, 5, 6, 7, 8, 9, 10, 11, 12, 13, 14, 15, 20, 25, 30, 35 g/g hr, and increments between.

In general, the condensation reaction should be carried out at a temperature at which the thermodynamics of the proposed reaction are favorable. For condensed phase liquid reactions, the pressure within the reactor must be sufficient to maintain at least a portion of the reactants in the condensed liquid phase at the reactor inlet. For vapor phase reactions, the reaction should be carried out at a temperature where the vapor pressure of the oxygenates is at least about 10 kPa, and the thermodynamics of the reaction are favorable. The condensation temperature will vary depending upon the specific intermediates used, but is generally in the range of from about 77° C. to 502° C. for reactions taking place in the vapor phase, and more preferably from about 127° C. to 452° C. For liquid phase reactions, the condensation temperature may be from about 7° C. to 477° C., and the condensation pressure from about 0.1 kPa to 10,000 kPa. Preferably, the condensation temperature is between about 17° C. and 302° C., or between about 17° C. and 252° C. for difficult substrates.

Varying the factors above, as well as others, will generally result in a modification to the specific composition and yields of the C4+ compounds. For example, varying the temperature and/or pressure of the reactor system, or the particular catalyst formulations, may result in the production of C4+ alcohols and/or ketones instead of C4+ hydrocarbons. The C4+ hydrocarbon product may also contain a variety of olefins, and alkanes of various sizes (typically branched alkanes). Depending upon the condensation catalyst used, the hydrocarbon product may also include aromatic and cyclic hydrocarbon compounds. The C4+ hydrocarbon product may also contain undesirably high levels of olefins, which may lead to coking or deposits in combustion engines, or other undesirable hydrocarbon products. In such event, the hydrocarbon molecules produced may be optionally hydrogenated to reduce the ketones to alcohols and hydrocarbons, while the alcohols and unsaturated hydrocarbon may be reduced to alkanes, thereby forming a more desirable hydrocarbon product having low levels of olefins, aromatics or alcohols.

The condensation reactions may be carried out in any reactor of suitable design, including continuous-flow, batch, semi-batch or multi-system reactors, without limitation as to design, size, geometry, flow rates, etc. The reactor system may also use a fluidized catalytic bed system, a swing bed system, fixed bed system, a moving bed system, or a combination of the above. In some embodiments, bi-phasic (e.g., liquid-liquid) and tri-phasic (e.g., liquid-liquid-solid) reactors may be used to carry out the condensation reactions.

In a continuous flow system, the reactor system can include an optional dehydrogenation bed adapted to produce dehydrogenated intermediates, an optional dehydration bed adapted to produce dehydrated intermediates, and a condensation bed to produce C4+ compounds from the intermediates. The dehydrogenation bed is configured to receive the reactant stream and produce the desired intermediates, which may have an increase in the amount of carbonyl-containing compounds. The de-hydration bed is configured to receive the reactant stream and produce the desired intermediates. The condensation bed is configured to receive the intermediates for contact with the condensation catalyst and production of the desired C4+ compounds. For systems with one or more finishing steps, an additional reaction bed for conducting the finishing process or processes may be included after the condensation bed.

In an embodiment, the optional dehydration reaction, the optional dehydrogenation reaction, the optional ketonization reaction, the optional ring opening reaction, and the condensation reaction catalyst beds may be positioned within the same reactor vessel or in separate reactor vessels in fluid communication with each other. Each reactor vessel preferably includes an outlet adapted to remove the product stream from the reactor vessel. For systems with one or more finishing steps, the finishing reaction bed or beds may be within the same reactor vessel along with the condensation bed or in a separate reactor vessel in fluid communication with the reactor vessel having the condensation bed.

In an embodiment, the reactor system also includes additional outlets to allow for the removal of portions of the reactant stream to further advance or direct the reaction to the desired reaction products, and to allow for the collection and recycling of reaction byproducts for use in other portions of the system. In an embodiment, the reactor system also includes additional inlets to allow for the introduction of supplemental materials to further advance or direct the reaction to the desired reaction products, and to allow for the recycling of reaction byproducts for use in other reactions.

In an embodiment, the reactor system also includes elements which allow for the separation of the reactant stream into different components which may find use in different reaction schemes or to simply promote the desired reactions. For instance, a separator unit, such as a phase separator, extractor, purifier or distillation column, may be installed prior to the condensation step to remove water from the reactant stream for purposes of advancing the condensation reaction to favor the production of higher hydrocarbons. In an embodiment, a separation unit is installed to remove specific intermediates to allow for the production of a desired product stream containing hydrocarbons within a particular carbon number range, or for use as end products or in other systems or processes.

The condensation reaction can produce a broad range of compounds with carbon numbers ranging from C4 to C30 or greater. Exemplary compounds include, but are not limited to, C4+ alkanes, C4+ alkenes, C5+ cycloalkanes, C5+ cycloalkenes, aryls, fused aryls, C4+ alcohols, C4+ ketones, and mixtures thereof. The C4+ alkanes and C4+ alkenes may range from 4 to 30 carbon atoms (C4-C30 alkanes and C4-C30 alkenes) and may be branched or straight chained alkanes or alkenes. The C4+ alkanes and C4+ alkenes may also include fractions of C7-C14, C12-C24 alkanes and alkenes, respectively, with the C7-C14 fraction directed to jet fuel blend, and the C12-C24 fraction directed to a diesel fuel blend and other industrial applications. Examples of various C4+ alkanes and C4+ alkenes include, without limitation, butane, butene, pentane, pentene, 2-methylbutane, hexane, hexene, 2-methylpentane, 3-methylpentane, 2,2-dimethylbutane, 2,3-dimethylbutane, heptane, heptene, octane, octene, 2,2,4,-trimethylpentane, 2,3-dimethyl hexane, 2,3,4-trimethylpentane, 2,3-dimethylpentane, nonane, nonene, decane, decene, undecane, undecene, dodecane, dodecene, tridecane, tridecene, tetradecane, tetradecene, pentadecane, pentadecene, hexadecane, hexadecene, heptyldecane, heptyldecene, octyldecane, octyldecene, nonyldecane, nonyldecene, eicosane, eicosene, uneicosane, uneicosene, doeicosane, doeicosene, trieicosane, trieicosene, tetraeicosane, tetraeicosene, and isomers thereof.

The C5+ cycloalkanes and C5+ cycloalkenes have from 5 to 30 carbon atoms and may be unsubstituted, mono-substituted or multi-substituted. In the case of mono-substituted and multi-substituted compounds, the substituted group may include a branched C3+ alkyl, a straight chain C1+ alkyl, a branched C3+ alkylene, a straight chain C1+ alkylene, a straight chain C2+ alkylene, a phenyl or a combination thereof. In one embodiment, at least one of the substituted groups include a branched C3-C12 alkyl, a straight chain C1-C12 alkyl, a branched C3-C12 alkylene, a straight chain C1-C12 alkylene, a straight chain C2-C12 alkylene, a phenyl or a combination thereof. In yet another embodiment, at least one of the substituted groups includes a branched C3-C4 alkyl, a straight chain C1-C4 alkyl, a branched C3-C4 alkylene, a straight chain C1-C4 alkylene, a straight chain C2-C4 alkylene, a phenyl, or any combination thereof. Examples of desirable C5+ cycloalkanes and C5+ cycloalkenes include, without limitation, cyclopentane, cyclopentene, cyclohexane, cyclohexene, methyl-cyclopentane, methyl-cyclopentene, ethyl-cyclopentane, ethyl-cyclopentene, ethyl-cyclohexane, ethyl-cyclohexene, and isomers thereof.

Aryls will generally consist of an aromatic hydrocarbon in either an unsubstituted (phenyl), mono-substituted or multi-substituted form. In the case of mono-substituted and multi-substituted compounds, the substituted group may include a branched C3+ alkyl, a straight chain C1+ alkyl, a branched C3+ alkylene, a straight chain C2+ alkylene, a phenyl or a combination thereof. In one embodiment, at least one of the substituted groups includes a branched C3-C12 alkyl, a straight chain C1-C12 alkyl, a branched C3-C12 alkylene, a straight chain C2-C12 alkylene, a phenyl, or any combination thereof. In yet another embodiment, at least one of the substituted groups includes a branched C3-C4 alkyl, a straight chain C1-C4 alkyl, a branched C3-C4 alkylene, straight chain C2-C4 alkylene, a phenyl, or any combination thereof. Examples of various aryls include, without limitation, benzene, toluene, xylene (dimethylbenzene), ethyl benzene, para xylene, meta xylene, ortho xylene, C9 aromatics.

Fused aryls will generally consist of bicyclic and polycyclic aromatic hydrocarbons, in either an unsubstituted, mono-substituted or multi-substituted form. In the case of mono-substituted and multi-substituted compounds, the substituted group may include a branched C3+ alkyl, a straight chain C1+ alkyl, a branched C3+ alkylene, a straight chain C2+ alkylene, a phenyl or a combination thereof. In another embodiment, at least one of the substituted groups includes a branched C3-C4 alkyl, a straight chain C1-C4 alkyl, a branched C3-C4 alkylene, a straight chain C2-C4 alkylene, a phenyl, or any combination thereof. Examples of various fused aryls include, without limitation, naphthalene, anthracene, tetrahydronaphthalene, and decahydronaphthalene, indane, indene, and isomers thereof.

The moderate fractions, such as C7-C14, may be separated for jet fuel, while heavier fractions, (e.g., C12-C24), may be separated for diesel use. The heaviest fractions may be used as lubricants or cracked to produce additional gasoline and/or diesel fractions. The C4+ compounds may also find use as industrial chemicals, whether as an intermediate or an end product. For example, the aryls toluene, xylene, ethyl benzene, para xylene, meta xylene, ortho xylene may find use as chemical intermediates for the production of plastics and other products. Meanwhile, the C9 aromatics and fused aryls, such as naphthalene, anthracene, tetrahydronaphthalene, and decahydronaphthalene, may find use as solvents in industrial processes.

In an embodiment, additional processes are used to treat the fuel blend to remove certain components or further conform the fuel blend to a diesel or jet fuel standard. Suitable techniques include hydrotreating to reduce the amount of or remove any remaining oxygen, sulfur, or nitrogen in the fuel blend. The conditions for hydrotreating a hydrocarbon stream are known to one of ordinary skill in the art.

In an embodiment, hydrogenation is carried out in place of or after the hydrotreating process to saturate at least some olefinic bonds. In some embodiments, a hydrogenation reaction may be carried out in concert with the aldol condensation reaction by including a metal functional group with the aldol condensation catalyst. Such hydrogenation may be performed to conform the fuel blend to a specific fuel standard (e.g., a diesel fuel standard or a jet fuel standard). The hydrogenation of the fuel blend stream can be carried out according to known procedures, either with the continuous or batch method. The hydrogenation reaction may be used to remove a remaining carbonyl group or hydroxyl group. In such event, any one of the hydrogenation catalysts described above may be used. Such catalysts may include any one or more of the following metals, Cu, Ni, Fe, Co, Ru, Pd, Rh, Pt, Ir, Os, alloys or combinations thereof, alone or with promoters such as Au, Ag, Cr, Zn, Mn, Sn, Cu, Bi, and alloys thereof, may be used in various loadings ranging from about 0.01 wt % to about 20 wt % on a support as described above. In general, the finishing step is carried out at finishing temperatures of between about 80° C. to 250° C., and finishing pressures in the range of about 700 kPa to 15,000 kPa. In one embodiment, the finishing step is conducted in the vapor phase or liquid phase, and uses, external $H_2$, recycled $H_2$, or combinations thereof, as necessary.

In an embodiment, isomerization is used to treat the fuel blend to introduce a desired degree of branching or other shape selectivity to at least some components in the fuel blend. It may be useful to remove any impurities before the hydrocarbons are contacted with the isomerization catalyst. The isomerization step comprises an optional stripping step, wherein the fuel blend from the oligomerization reaction may be purified by stripping with water vapor or a suitable gas such as light hydrocarbon, nitrogen or hydrogen. The optional stripping step is carried out in a counter-current manner in a unit upstream of the isomerization catalyst, wherein the gas and liquid are contacted with each other, or before the actual isomerization reactor in a separate stripping unit utilizing counter-current principle.

After the optional stripping step the fuel blend can be passed to a reactive isomerization unit comprising one or several catalyst bed(s). The catalyst beds of the isomerization step may operate either in co-current or counter-current manner. In the isomerization step, the pressure may vary from 2000 kPa to 15,000 kPa, preferably in the range of 2000 kPa to 10,000 kPa, the temperature being between 197° C. and 502° C., preferably between 302° C. and 402° C. In the isomerization step, any isomerization catalysts known in the art may be used. Suitable isomerization catalysts can contain molecular sieve and/or a metal from Group VII and/or a carrier. In an embodiment, the isomerization catalyst contains SAPO-11 or SAPO41 or ZSM-22 or ZSM-23 or ferrierite and Pt, Pd or Ni and Al2O3 or SiO2. Typical isomerization catalysts are, for example, Pt/SAPO-11/Al2O3, Pt/ZSM-22/Al2O3, Pt/ZSM-23/Al2O3 and Pt/SAPO-11/SiO2.

Other factors, such as the concentration of water or undesired o intermediates, may also effect the composition and yields of the C4+ compounds, as well as the activity and stability of the condensation catalyst. In such event, the process may include a dewatering step that removes a portion of the water prior to the condensation reaction and/or the optional dehydration reaction, or a separation unit for removal of the undesired intermediates. For instance, a separator unit, such as a phase separator, extractor, purifier or distillation column, may be installed prior to the condensation step so as to remove a portion of the water from the reactant stream containing the intermediates. A separation unit may also be installed to remove specific intermediates to allow for the production of a desired product stream containing hydrocarbons within a particular carbon range, or for use as end products or in other systems or processes.

Thus, in one embodiment, the fuel blend produced by the processes described herein is a hydrocarbon mixture that meets the requirements for jet fuel (e.g., conforms with ASTM D1655). In another embodiment, the product of the processes described herein is a hydrocarbon mixture that comprises a fuel blend meeting the requirements for a diesel fuel (e.g., conforms with ASTM D975).

Yet in another embodiment of the invention, the $C_{2+}$ olefins are produced by catalytically reacting the intermediates in the presence of a dehydration catalyst at a dehydration temperature and dehydration pressure to produce a reaction stream comprising the $C_{2+}$ olefins. The $C_{2+}$ olefins comprise straight or branched hydrocarbons containing one or more carbon-carbon double bonds. In general, the $C_{2+}$ olefins contain from 2 to 8 carbon atoms, and more preferably from 3 to 5 carbon atoms. In one embodiment, the olefins comprise propylene, butylene, pentylene, isomers of the foregoing, and mixtures of any two or more of the foregoing. In another embodiment, the $C_{2+}$ olefins include $C_{4+}$ olefins produced by catalytically reacting a portion of the $C_{2+}$ olefins over an olefin isomerization catalyst. In an embodiment, a method of forming a fuel blend from a biomass feedstock may comprise a digester that receives a biomass feedstock and a digestive solvent operating under conditions to effectively remove nitrogen and sulfur compounds from said biomass feedstock and discharges a treated stream comprising a carbohydrate having less than 35% of the sulfur content and less than 35% of the nitrogen content based on the undigested biomass feedstock on a dry mass basis; a hydrogenolysis reactor comprising a hydrocatalytic treatment catalyst that receives the treated stream and discharges an oxygenated intermediate, wherein a first portion of the oxygenated hydrocatalytically treated mixture is recycled to the digester as at least a portion of the digestive solvent; a first fuels processing reactor comprising a dehydrogenation catalyst that receives a second portion of the oxygenated hydrocatalytically treated mixture and discharges an olefin-containing stream; and a second fuels processing reactor comprising an alkylation catalyst that receives the olefin-containing stream and discharges a liquid fuel.

The dehydration catalyst comprises a member selected from the group consisting of an acidic alumina, aluminum phosphate, silica-alumina phosphate, amorphous silica-alumina, aluminosilicate, zirconia, sulfated zirconia, tungstated zirconia, tungsten carbide, molybdenum carbide, titania, sulfated carbon, phosphated carbon, phosphated silica, phosphated alumina, acidic resin, heteropolyacid, inorganic acid, and a combination of any two or more of the foregoing. In one embodiment, the dehydration catalyst further comprises a modifier selected from the group consisting of Ce, Y, Sc, La, Li, Na, K, Rb, Cs, Mg, Ca, Sr, Ba, P, B, Bi, and a combination of any two or more of the foregoing. In another embodiment, the dehydration catalyst further comprises an oxide of an element, the element selected from the group consisting of Ti, Zr, V, Nb, Ta, Mo, Cr, W, Mn, Re, Al, Ga, In, Fe, Co, Ir, Ni, Si, Cu, Zn, Sn, Cd, P, and a combination of any two or more of the foregoing. In yet another embodiment, the dehydration catalyst further comprises a metal selected from the group consisting of Cu, Ag, Au, Pt, Ni, Fe, Co, Ru, Zn, Cd, Ga, In, Rh, Pd, Ir, Re, Mn, Cr, Mo, W, Sn, Os, an alloy of any two or more of the foregoing, and a combination of any two or more of the foregoing.

In yet another embodiment, the dehydration catalyst comprises an aluminosilicate zeolite. In one version, the dehydration catalyst further comprises a modifier selected from the group consisting of Ga, In, Zn, Fe, Mo, Ag, Au, Ni, P, Sc, Y, Ta, a lanthanide, and a combination of any two or more of the foregoing. In another version, the dehydration catalyst further comprises a metal selected from the group consisting of Cu, Ag, Au, Pt, Ni, Fe, Co, Ru, Zn, Cd, Ga, In, Rh, Pd, Ir, Re, Mn, Cr, Mo, W, Sn, Os, an alloy of any two or more of the foregoing, and a combination of any two or more of the foregoing.

In another embodiment, the dehydration catalyst comprises a bifunctional pentasil ring-containing aluminosilicate zeolite. In one version, the dehydration catalyst further comprises a modifier selected from the group consisting of Ga, In, Zn, Fe, Mo, Ag, Au, Ni, P, Sc, Y, Ta, a lanthanide, and a combination of any two or more of the foregoing. In another version, the dehydration catalyst further comprises a metal selected from the group consisting of Cu, Ag, Au, Pt, Ni, Fe, Co, Ru, Zn, Cd, Ga, In, Rh, Pd, Ir, Re, Mn, Cr, Mo, W, Sn, Os, an alloy of any two or more of the foregoing, and a combination of any two or more of the foregoing.

The dehydration reaction is conducted at a temperature and pressure where the thermodynamics are favorable. In general, the reaction may be performed in the vapor phase, liquid phase, or a combination of both. In one embodiment, the dehydration temperature is in the range of about 100° C. to 500° C., and the dehydration pressure is in the range of about 0 psig to 900 psig. In another embodiment, the dehydration temperature is in the range of about 125° C. to 450° C., and the dehydration pressure is at least 2 psig. In another version, the dehydration temperature is in the range of about 150° C. to 350° C., and the dehydration pressure is in the range of about 100 psig to 800 psig. In yet another version, the dehydration temperature is in the range of about 175° C. to 325° C.

The $C_{6+}$ paraffins are produced by catalytically reacting the $C_{2+}$ olefins with a stream of $C_{4+}$ isoparaffins in the presence of an alkylation catalyst at an alkylation temperature and alkylation pressure to produce a product stream comprising $C_{6+}$ paraffins. The $C_{4+}$ isoparaffins include alkanes and cycloalkanes having 4 to 7 carbon atoms, such as isobutane, isopentane, naphthenes, and higher homologues having a tertiary carbon atom (e.g., 2-methylbutane and 2,4-dimethylpentane), isomers of the foregoing, and mixtures of any two or more of the foregoing. In one embodiment, the stream of $C_{4+}$ isoparaffins comprises of internally generated $C_{4+}$ isoparaffins, external $C_{4+}$ isoparaffins, recycled $C_{4+}$ isoparaffins, or combinations of any two or more of the foregoing.

The $C_{6+}$ paraffins will generally be branched paraffins, but may also include normal paraffins. In one version, the $C_{6+}$ paraffins comprises a member selected from the group consisting of a branched $C_{6-10}$ alkane, a branched $C_6$ alkane, a branched $C_7$ alkane, a branched $C_8$ alkane, a branched $C_9$ alkane, a branched $C_{10}$ alkane, or a mixture of any two or more of the foregoing. In one version, the C.sub.6+ paraffins comprise dimethylbutane, 2,2-dimethylbutane, 2,3-dimethylbutane, methylpentane, 2-methylpentane, 3-methylpentane, dimethylpentane, 2,3-dimethylpentane, 2,4-dimethylpentane, methylhexane, 2,3-dimethylhexane, 2,3,4-trimethylpentane, 2,2,4-trimethylpentane, 2,2,3-trimethylpentane, 2,3,3-trimethylpentane, dimethylhexane, or mixtures of any two or more of the foregoing.

The alkylation catalyst comprises a member selected from the group of sulfuric acid, hydrofluoric acid, aluminum chloride, boron trifluoride, solid phosphoric acid, chlorided alumina, acidic alumina, aluminum phosphate, silica-alumina phosphate, amorphous silica-alumina, aluminosilicate, aluminosilicate zeolite, zirconia, sulfated zirconia, tungstated zirconia, tungsten carbide, molybdenum carbide, titania, sulfated carbon, phosphated carbon, phosphated silica, phosphated alumina, acidic resin, heteropolyacid, inorganic acid, and a combination of any two or more of the foregoing. The alkylation catalyst may also include a mixture of a mineral acid with a Friedel-Crafts metal halide, such as aluminum bromide, and other proton donors.

In one embodiment, the alkylation catalyst comprises an aluminosilicate zeolite. In one version, the alkylation catalyst further comprises a modifier selected from the group consisting of Ga, In, Zn, Fe, Mo, Ag, Au, Ni, P, Sc, Y, Ta, a lanthanide, and a combination of any two or more of the foregoing. In another version, the alkylation catalyst further comprises a metal selected from the group consisting of Cu, Ag, Au, Pt, Ni, Fe, Co, Ru, Zn, Cd, Ga, In, Rh, Pd, Ir, Re, Mn, Cr, Mo, W, Sn, Os, an alloy of any two or more of the foregoing, and a combination of any two or more of the foregoing.

In another embodiment, the alkylation catalyst comprises a bifunctional pentasil ring-containing aluminosilicate zeolite. In one version, the alkylation catalyst further comprises a modifier selected from the group consisting of Ga, In, Zn, Fe, Mo, Ag, Au, Ni, P, Sc, Y, Ta, a lanthanide, and a combination of any two or more of the foregoing. In another version, the alkylation catalyst further comprises a metal selected from the group consisting of Cu, Ag, Au, Pt, Ni, Fe, Co, Ru, Zn, Cd, Ga, In, Rh, Pd, Ir, Re, Mn, Cr, Mo, W, Sn, Os, an alloy of any two or more of the foregoing, and a combination of any two or more of the foregoing. In one version, the dehydration catalyst and the alkylation catalyst are atomically identical.

The alkylation reaction is conducted at a temperature where the thermodynamics are favorable. In general, the alkylation temperature is in the range of about −20° C. to 300° C., and the alkylation pressure is in the range of about 0 psig to 1200 psig. In one version, the alkylation temperature is in the range of about 100° C. to 300° C. In another version, the alkylation temperature is in the range of about 0° C. to 100° C., and the alkylation pressure is at least 100 psig. In yet another version, the alkylation temperature is in the range of about 0° C. to 50° C. and the alkylation pressure is less than 300 psig. In still yet another version, the alkylation temperature is in the range of about 70° C. to 250° C., and the alkylation pressure is in the range of about 100 psig to 1200 psig. In one embodiment, the alkylation catalyst comprises a mineral acid or a strong acid and the alkylation temperature is less than ° C. In another embodiment, the alkylation catalyst comprises a zeolite and the alkylation temperature is greater than 100° C.

Without wishing to be limited by theory, it is believed that the organic phase solvent is effective in preventing tar or heavy ends deposition during biomass digestion, and in assisting with the digestion via solvation. It is also known that hydrogen solubility is greater in organic solvents vs. water, such that for a given system pressure of hydrogen, hydrogenation reactions are accelerated by the improved solubility afforded by use of organic, hydrocarbon-rich solvent.

To facilitate a better understanding of the present invention, the following examples of certain aspects of some embodiments are given. In no way should the following examples be read to limit, or define, the entire scope of the invention.

EXAMPLES

Reaction studies for Examples 1-12 were conducted in a Parr5000 Hastelloy multireactor comprising 6×75-milliliter reactors operated in parallel at pressures up to 135 bar, and temperatures up to 275° C., stirred by magnetic stir bar. Reaction samples were analyzed for sugar, polyol, and organic acids using an HPLC method entailing a Bio-Rad Aminex HPX-87H column (300 mm×7.8 mm) operated at 0.6 ml/minute of a mobile phase of 5 mM Sulfuric Acid in water, at an oven temperature of 30° C., a run time of 70 minutes, and both RI and UV (320 nm) detectors.

Product formation (mono-oxygenates, glycols, diols, alkanes, acids) were monitored via a gas chromatographic (GC) method "DB5-ox", entailing a 60-m×0.32 mm ID DB-5 column of 1 μm thickness, with 50:1 split ratio, 2 ml/min helium flow, and column oven at 40° C. for 8 minutes, followed by ramp to 285° C. at 10° C./min, and a hold time of 53.5 minutes. Injector temperature is set at 250° C., and detector temperature at 300° C.

Gasoline production potential by condensation was assessed via injection of one microliters of liquid intermediate product into a catalytic pulse microreactor entailing a GC insert packed with 0.12 grams of ZSM-5 catalyst, held at 375° C., followed by Restek Rtx-1701 (60-m) and DB-5 (60-m) capillary GC columns in series (120-m total length, 0.32 mm ID, 0.25 um film thickness) for an Agilent/HP 6890 GC equipped with flame ionization detector. Helium flow was 2.0 ml/min (constant flow mode), with a 10:1 split ratio. Oven temperature was held at 35° C. for 10 minutes, followed by a ramp to 270° C. at 3° C./min, followed by a 1.67 minute hold time. Detector temperature was 300° C.

Example 1

Aqueous Phase Hydrolysis and Reduction of Biomass 2.002 grams of ground soft pine wood (16% moisture; 67.8% carbohydrate on dry basis) were charged with 20.44 grams of deionized water, and 0.451 grams of 5% Ru/C Escat 4401 catalyst (from Strem Chemicals, Inc., 50% wet), to a Parr 5000 reactor. The reactor was pressured to 54 bar with $H_2$, and ramped from 170-240° C. over 6 hours, before maintaining 240° C. overnight to complete reaction. Following reaction, solids were recovered by filtration on Whatman #2 filter paper, and oven dried overnight at 90° C. to assess the extent of digestion of biomoass. Results indicated greater than 90% digestion of the softwood charged, into liquid soluble products.

Gas chromatographic analysis of a sample of the resulting aqueous phase using the DB5-ox method indicated the presence of 1.41 wt % products relative to n-butanol internal standard. This corresponded to 41% of the theoretical yield, basis the carbohydrate content of the wood charged.

Example 2

Organic Phase Hydrolysis and Reduction of Biomass 2.007 grams of ground soft pine (16% moisture) were charged with 20.21 grams of a solvent comprising 8% deionized water and 92% 1-pentanol, and 0.455 grams of 5% Ru/C Escat 4401 catalyst (from Strem Chemicals, Inc., 50% wet), to a Parr 5000 reactor. This solvent composition was in the single phase region at 298 K, but near the phase boundry for maximum water solubility in 1-pentanol of 9.8-10.2 wt %, as reported by M. Góral, B. Wiśniewska-Goclowska, and A. M ączyńskia in Recommended Liquid-Liquid Equilibrium Data, Part 4: 1-Alkanol—Water Systems, J. Phys. Chem. Ref. Data, Vol. 35, No. 3, 2006. Water solubility is increased at reaction temperature.

The reactor was pressured with hydrogen to 54 bar, and heated using the same schedule as Example 1. Filtration again revealed greater than 90% digestion of wood. Gas chromatographic analysis of the solvent phase via the DB5-ox method indicated 107% of the theoretical yield of hydrocarbon and oxygenate components of retention less than sorbitol (hexose alcohol), basis the carbohydrate content of the wood charged. Excess yield above theoretical carbohydrate conversion may be due to experimental error, or to conversion of a portion of the lignin fraction to targeted intermediates.

This result show the superior ability of the 1-pentanol-rich solvent in solubilizing the reaction products of biomass hydrolysis, relative to water only as solvent in example 1.

Examples 3-6

The experiment of example 1 was repeated with 1-pentanol (examples 3 and 4), 1-octanol (example 5), and toluene (example 6) as solvent, and varying amounts of water relative to solubility limits in alcohol solvents reported by R. Stephenson, J. Stuart, M. Tabak, J. Chem. Eng. Data 1984, 29, 287-290, and in toluene as reported by B. J. Neely, J. Wagner, R. L. Robinson, Jr., K. A. M. Gasem, J. Chem. Eng. Data 2008, 53, 165-174. Reaction conditions and conversions are shown in Table 1. Examples #3, 4, and 6 used 5% Ru/C Escat 4401 catalyst (from Strem Chemicals, Inc., 50% wet) as catalyst. Example #5 used DC-2534 sulfided cobalt molybdate hydrotreating catalyst from Criterion Catalyst & Technologies L.P., and entailed addition of alanine and cysteine to the solvent mixture to model amino acids present in recycle solvent generated in a continuous process.

TABLE 1

Parr5000 Wood Digestion and Reaction

| Ex | Solvent | $H_2O$ wt % | $H_2O$ wt % solubility 20-25° C. | Amino acid | Catalyst | Dry wt % catalyst | wood % digest | GC yield (% theoretical) |
|---|---|---|---|---|---|---|---|---|
| 3 | 1-pentanol | 9.30 | 10.21 | none | 5% Ru/C | 1.14 | 74.0 | 115.1 |
| 4 | 1-pentanol | 9.30 | 10.21 | ala + cys* | DC2534S | 1.74 | 90.7 | 117.2 |
| 5 | 1-octanol | 3.30 | 4.90 | none | 5% Ru/C | 1.13 | 79.2 | 166.7 |
| 6 | toluene | 1.30 | 0.03 | none | 5% Ru/C | 1.15 | 71.9 | 21.6 |

170-240° C. ramp (6-h) followed by overnight 240° C.; 54 bar $H_2$ charged at room temperature.
*Ex#4 with 1500 ppm alanine, 150 ppm cysteine. Cat The examples demonstrated greater than 70% digestion of wood biomass. Observed GC yields of intermediates of retention time less than $C_6$ sugar alcohol were greater than 100%, which may be attributable to digestion or solubilization of lignin also present in the wood feed. GC yields were lowest for toluene as solvent, where no water was added beyond that present in the ground wood charged to the reactor. This result suggests that water may be needed at higher concentrations to effect hydrolysis of the woody biomass, to produce components which can elute from the GC analysis.

Examples 7-11

The experiments of examples 3-6 were repeated, with multiple additions of pine wood to obtain a high actives concentration in the reaction solution, calculated from filtration results as the percent digestion of wood, relative to solvent present. Results demonstrate that for all solvent systems, more than 55% digestion of woody biomass could be digested over three cycles, to obtain an actives concentration in solution of greater than 10 weight percent. Observable intermediates via GC analysis was greater than 70% of the expected yields, except for the run with toluene where a lower concentration of water was used. Total water concentrations approached or exceeded the solubility limit for water in solvent at room temperature. Water solubilities increase with temperature, as reported by Stephenson et al. and Neely et al. (op. cit), however, such that all systems were undersaturated with water under reaction conditions.

TABLE 2

Multicycle additions of wood biomass, 170-240° C. digestion, 52 bar $H_2$

| Solvent | $H_2O$ wt % | $H_2O$ wt % solubility 20-25 C. | Amino acid | Catalyst | wt % cat | wt % wood % digest | GC yield (% theory) | % active |
|---|---|---|---|---|---|---|---|---|
| 1-pentanol | 10.05 | 10.21 | none | 5% Ru/C | 1.13 | 60.8 | 76.8 | 10.9 |
| 1-pentanol | 10.05 | 10.21 | ala + cys* | DC2534S | 1.80 | 57.3 | 69.8 | 10.4 |
| 1-octanol | 5.44 | 4.90 | none | 5% Ru/C | 1.15 | 72.0 | 96.7 | 12.6 |
| toluene | 1.30 | 0.03 | none | 5% Ru/C | 1.13 | 60.6 | 22.2 | 10.9 |

Final reaction samples were injected onto the ZSM-5 catalytic pulse microreactor, and revealed the formation of alkanes, as well as benzene, toluene, ethylbenzene, tri-methyl benzenes, xylenes, and naphthalenes.

Example 12

In Situ Formation of Organic Rich Solvent Phase

A microflow reactor was packed with 4.53 grams of Criterion DC2534 catalyst, and tested via feed of $C_6$ sugar alcohol (sorbitol) as representative of the hydrolysis of cellulosic biomass. A feed of 48 wt % sorbitol in deionized water was passed through the catalyst bed at a weight hourly space velocity of 0.3/hour, along with $H_2$ feed at an excess flow of 9.5 ml/min (measured at 25 C and atmospheric pressure), with bed temperature varied from 240-260° C. Liquid product comprised an upper hydrocarbon-rich ("oil") layer, and an aqueous layer, with the oil-rich layer comprising 7-15 volume percent of the total liquid products. On day 20 for example, the oil-rich layer comprised 15% of the volume of liquid product obtained following operation at 260° C., while on day 24 the oil fraction was reduced to 10% of total product, upon operation at 250° C. Analysis via liquid chromatography indicated more than 80% conversion of sorbitol to hydrogenated products.

Analysis of liquid product via a combined Gas-chromatography-Mass Spectrometry (GCMS) method indicated the formation of ketones and alcohols greater or equal to than C4 (1-butanol), and especially pentanols and hexanols, which comprise the hydrocarbon-rich phase ("oil" layer) formed. This example shows the in situ formation of non-water-miscible, hydrocarbon-rich solvent via hydrogenation of sugar alcohols.

TABLE 3

GC MS of upper hydrocarbon rich phase from hydrogenation of 48% sorbitol solution

| Comp # | Compound Name | RT (min) | Area % |
|---|---|---|---|
| 1 | Water | 7.946 | 3.9% |
| 2 | Methanol | 8.426 | 2.3% |
| 3 | Ethanol | 9.456 | 0.9% |
| 4 | 2-Propanol | 10.515 | 3.8% |
| 5 | 1-Propanol | 12.775 | 4.6% |
| 6 | 2-Butanone | 14.375 | 1.7% |

TABLE 3-continued

GC MS of upper hydrocarbon rich phase from hydrogenation of 48% sorbitol solution

| Comp # | Compound Name | RT (min) | Area % |
|---|---|---|---|
| 7 | 2-butanol | 15.051 | 5.4% |
| 8 | Furan, 2-methyl | 15.487 | 1.4% |
| 9 | Hexane | 15.918 | 7.6% |
| 10 | 3-Hexene | 16.035 | 0.6% |
| 11 | 2-Hexene | 16.233 | 1.7% |
| 12 | 1-Butanol | 20.147 | 1.4% |
| 13 | 2-Pentanone | 21.929 | 2.4% |
| 14 | 3-Pentanone | 22.999 | 2.1% |
| 15 | 2-Pentanol | 23.833 | 5.1% |
| 16 | 3-Pentanol | 23.912 | 4.2% |
| 17 | Furan, 2-ethyl- | 24.425 | 4.4% |
| 18 | Furan, 2,5-dimethyl- | 25.088 | 6.8% |
| 19 | 1-Pentanol | 31.559 | 1.0% |
| 20 | 3-Hexanone | 32.855 | 3.8% |
| 21 | 2-Hexanone | 33.134 | 3.6% |
| 22 | 3-Hexanol | 34.238 | 5.3% |
| 23 | 2-Hexanol | 34.585 | 12.0% |
| 24 | Cyclopentanone, 2-methyl- | 36.662 | 0.5% |
| 25 | 1-Pentanol, 2-methyl | 37.014 | 0.8% |
| 26 | Cyclopentanol, methyl | 37.342 | 1.3% |
| 27 | Cyclopentanol, methyl | 37.479 | 0.8% |
| 28 | 1-Hexanol | 39.044 | 7.4% |
| 29 | Unknown | 39.691 | 1.2% |
| 30 | 3-Heptanone | 39.786 | 1.0% |
| 31 | 3-Heptanol | 40.509 | 0.7% |
| 32 | 4-Octanone | 43.606 | 0.2% |

Example 13

A 75-ml Parr 5000 reactor was fitted with glass liner and charged with 15.04 grams of 1-octanol solvent, and 0.118 grams of potassium carbonate buffer. 503 grams of nickel-oxide promoted cobalt molybdate catalyst were then added (DC-2534, containing 1-10% cobalt oxide and molybdenum trioxide (up to 30 wt %) on alumina, and less than 2% nickel, obtained from Criterion Catalyst & Technologies L.P.), and sulfided by the method described in US2010/0236988 Example 5.

The reactor was charged with 2.7 grams of southern pine mini-chips (39% moisture), of nominal size 3×5×5 mm in dimension before pressuring with 52 bar of hydrogen under stirring via stir bar. The reactor was heated to 190° C. for 1 hour before ramping over 15 minutes to a temperature of 250° C. and holding, to complete a 5-hour cycle.

The process was repeated for 6 cycles of wood addition, with addition of potassium carbonate as needed to maintain pH between 6-7. Virtually all wood was digested across 6 cycles. The oil and aqueous layers were analyzed by gas chromatography using a 60-m×0.32 mm ID DB-5 column of 1 μm thickness, with 50:1 split ratio, 2 ml/min helium flow, and column oven at 40° C. for 8 minutes, followed by ramp to 285° C. at 10° C./min, and a hold time of 53.5 minutes. The injector temperature was set at 250° C., and the detector temperature was set at 300° C.

A range of alkanes, ketone and aldehyde monooxygenates as well as glycol solvents and products, and polyols (glycerol) were observed, with volatility greater than C6 sugar alcohol sorbitol. GC measured products indicated a yield of 90% of products with volatility greater than sorbitol (C6 monomer), relative to the dry weight of wood initially charged.

What is claimed is:

1. A method comprising:
   (a) providing a biomass feedstock containing cellulose and water;
   (b) contacting the biomass feedstock with an organic solvent having partial miscibility with water at 25° C. to form a digested biomass stream containing the organic solvent and water at an organic solvent to water mass ratio of greater than 1:1;
   (c) contacting the digested biomass stream with molecular hydrogen in the presence of a metal catalyst capable of activating molecular hydrogen, under organic phase hydrothermal conditions to form a hydrocatalytically treated mixture that contains a plurality of hydrocarbon molecules and oxygenated hydrocarbon molecules;
   (d) phase separating the hydrocatalytically treated mixture, by liquid-liquid separation, into an organic hydrocarbon-rich phase and a water phase comprising water soluble oxygenated hydrocarbons;
   (e) providing at least a portion of the organic hydrocarbon-rich phase to step (b) to form at least a portion of the organic solvent; and
   (f) processing at least a portion of the water phase, at least a portion of the organic hydrocarbon-rich phase, or at least a portion of both water phase and organic hydrocarbon-rich phase, to form a fuel blend comprising higher hydrocarbons.

2. The method of claim 1 wherein water is present in the organic phase at a concentration of less than 50 weight percent.

3. The method of claim 2 wherein water is present in the organic phase at a concentration of less than 15 weight percent.

4. The method of claim 1 wherein the fuel blend comprises at least one composition selected from the group consisting of: a fuel additive, a gasoline fuel, a diesel fuel, and a jet fuel.

5. The method of claim 1 wherein step (f) comprises processing in the presence of a hydrogenation catalyst to form the fuel blend.

6. The method of claim 1 wherein step (c) is carried at a temperature in the range of 60° C. to 300° C.

7. The method of claim 1 wherein step (f) comprises processing in the presence of a condensation catalyst to form the fuel blend, wherein the fuel blend comprises a gasoline fuel.

8. The method of claim 1 wherein step (f) comprises processing in the presence of an acid catalyst to form at least some olefins; and contacting the olefins with an oligomerization catalyst to form the fuel blend.

9. The method of claim 1 wherein the hydrocatalytically treated mixture has a total organic content on a weight basis of greater than 50%.

10. The method of claim 1 wherein the metal catalyst capable of activating molecular hydrogen is a catalyst having a support material that has incorporated therein or is loaded with a metal component, which is or can be converted to a metal compound that has activity towards the catalytic hydrogenation, hydrogenolysis, and hydrodeoxygenation of soluble carbohydrates.

11. The method of claim 1 wherein step (b) is carried out at a temperature in the range from 100° C. to 300° C.

12. The method of claim 11 wherein step (b) is carried out at a pressure in a range from about 7 to 200 bar.

13. The method of claim 11 wherein step (c) is carried out at a temperature in the range of 110° C. to 300° C.

14. The method of claim 1 wherein the organic hydrocarbon-rich phase has a dielectric constant of greater than about 2.

* * * * *